US012703254B2

(12) United States Patent
Takahashi et al.

(10) Patent No.: US 12,703,254 B2
(45) Date of Patent: Aug. 11, 2026

(54) CONTACTLESS POWER SUPPLY SYSTEM, POWER TRANSMISSION APPARATUS, POWER RECEPTION APPARATUS

(71) Applicant: DENSO CORPORATION, Kariya-city (JP)

(72) Inventors: Masaya Takahashi, Kariya-city (JP); Yusei Nakayashiki, Kariya-city (JP); Mitsuru Shibanuma, Kariya-city (JP); Hidetoshi Yamada, Kariya-city (JP); Nobuhisa Yamaguchi, Kariya-city (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 19/202,098

(22) Filed: May 8, 2025

(65) Prior Publication Data

US 2025/0262957 A1 Aug. 21, 2025

Related U.S. Application Data

(63) Continuation of application No. PCT/JP2023/038237, filed on Oct. 24, 2023.

(30) Foreign Application Priority Data

Nov. 30, 2022 (JP) ................................ 2022-191017

(51) Int. Cl.
*B60L 53/122* (2019.01)
*B60L 53/22* (2019.01)
(Continued)

(52) U.S. Cl.
CPC ............. *B60L 53/122* (2019.02); *B60L 53/22* (2019.02); *H02J 50/12* (2016.02); *H02J 50/402* (2020.01);
(Continued)

(58) Field of Classification Search
CPC .... B60L 53/122; B60L 53/22; B60L 2210/30; B60L 2210/40; B60L 53/12; H02J 50/12;
(Continued)

(56) References Cited

U.S. PATENT DOCUMENTS

2012/0025761 A1* 2/2012 Takada .................. B60L 53/122 320/108
2012/0256495 A1* 10/2012 Fukaya ................... H02J 50/10 307/104

(Continued)

FOREIGN PATENT DOCUMENTS

JP 2010-226890 A 10/2010
JP 2013-212043 A 10/2013

(Continued)

*Primary Examiner* — Regis J Betsch
*Assistant Examiner* — Alex W Lam
(74) *Attorney, Agent, or Firm* — Oliff PLC

(57) ABSTRACT

A contactless power supply system is provided with a transmission apparatus, and a reception apparatus to which the transmission apparatus supplies power in a contactless manner. The reception apparatus includes: a secondary resonant circuit, a rectifier circuit, an immittance circuit, a load, a protection switch changing the state between a conductive state and a non-conductive state, thereby causing the secondary resonant circuit to be in a non-resonant state, and a secondary side control circuit that sets the protection switch to be in the conductive state or the non-conductive state. The primary side control circuit changes the impedance of the variable impedance element, using a detection value of the primary detection circuit which changes depending on the state of the protection switch being set to be in the conductive state or the non-conductive state, thereby causing the reception apparatus to be in the standby state from the transmission state.

14 Claims, 10 Drawing Sheets

(51) Int. Cl.
*H02J 50/12* (2016.01)
*H02J 50/40* (2016.01)

(52) U.S. Cl.
CPC ....... *B60L 2210/30* (2013.01); *B60L 2210/40* (2013.01)

(58) Field of Classification Search
CPC .......... H02J 50/402; H02J 50/60; H02J 50/90; H02J 2105/37; H02J 7/00; H02J 50/40; H02J 50/80
See application file for complete search history.

(56) References Cited

U.S. PATENT DOCUMENTS

| | | | | |
|---|---|---|---|---|
| 2013/0063085 | A1* | 3/2013 | Takada .................. | H01M 10/46 320/108 |
| 2015/0328997 | A1 | 11/2015 | Hashizume | |
| 2017/0085131 | A1* | 3/2017 | Liu .......................... | H03H 7/38 |
| 2020/0083748 | A1* | 3/2020 | Nakao ..................... | H02J 50/12 |
| 2020/0373752 | A1 | 11/2020 | Danilovic et al. | |
| 2020/0373768 | A1 | 11/2020 | Danilovic et al. | |
| 2023/0396100 | A1 | 12/2023 | Takahashi et al. | |

FOREIGN PATENT DOCUMENTS

| | | | |
|---|---|---|---|
| JP | 2016-178714 | A | 10/2016 |
| JP | 2017-169410 | A | 9/2017 |
| JP | 2022-127588 | A | 8/2022 |

* cited by examiner

FIG.1

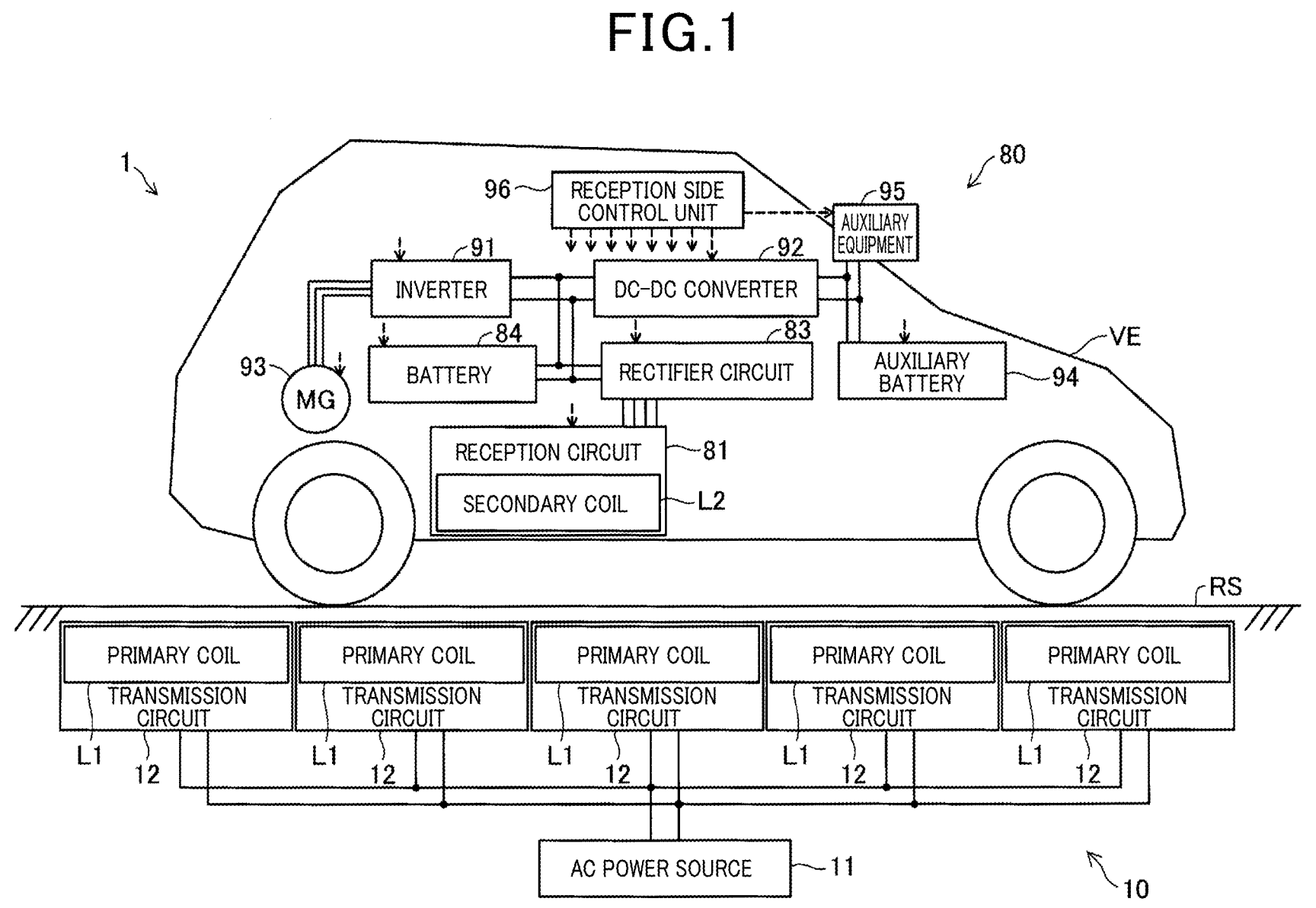

RECEPTION SIDE CONTROL UNIT
DC-DC CONVERTER
RECTIFIER CIRCUIT
RECEPTION CIRCUIT
SECONDARY COIL
INVERTER
BATTERY
AUXILIARY EQUIPMENT
AUXILIARY BATTERY
MG
PRIMARY COIL
TRANSMISSION CIRCUIT
AC POWER SOURCE
1 10 11 12 L1 L2 80 81 83 84 91 92 93 94 95 96 VE RS

FIG.4

401
480
410
84
N3
N4
Q1
Q2
D1
D2
483
85
86
L4
L6
C4
282
SW41
SW42
C2
C3
81
N1
N2
L2
SECONDARY SIDE CONTROL CIRCUIT
ABNORMALITY DETECTION CIRCUIT
96
RECEPTION SIDE CONTROL UNIT
12
C1
L1
L41
C42
11
15

501
580
210
212
C21
C22
M1
L1
SW21
11
13
PRIMARY SIDE CONTROL CIRCUIT
81
N1
N2
L2
TR
C2
C3
282
L4
C4
L6
283
D1
D2
Q1
Q2
N3
N4
84
87
STATE DETECTION CIRCUIT
M4
TEMPERATURE SENSOR
85
SECONDARY SIDE CONTROL CIRCUIT
86
ABNORMALITY DETECTION CIRCUIT
96
RECEPTION SIDE CONTROL UNIT

CONTACTLESS POWER SUPPLY SYSTEM, POWER TRANSMISSION APPARATUS, POWER RECEPTION APPARATUS

CROSS-REFERENCE OF RELATED APPLICATIONS

This application is the U.S. bypass application of International Application No. PCT/JP2023/038237 filed on Oct. 24, 2023, which designated the U.S. and claims priority to Japanese Patent Application 2022-191017 filed on Nov. 30, 2022, and the contents of both of these are incorporated herein by reference.

BACKGROUND

Technical Field

The present disclosure relates to a contactless power supply apparatus, a power transmission apparatus, a power reception apparatus.

Description of the Related Art

Conventionally, a technique is disclosed for a power reception apparatus supplied with power from a power transmission apparatus in a contactless manner, for protecting a load to be supplied with the received power when an abnormality occurs. According to the above-mentioned technique, a transistor included in a rectifier is controlled to be ON, and thereafter, a relay disposed on a current path from a resonator coil to the rectifier is controlled to be opened, thereby protecting the load.

Since the power transmission apparatus continues to transmit power even after the power reception apparatus stops receiving the power, a power loss possibly occurs in the power transmission apparatus.

SUMMARY

According to a first aspect of the present disclosure, a contactless power supply system is provided to include a transmission apparatus and a reception apparatus to which the transmission apparatus supplies power in a contactless manner. The reception apparatus includes: a secondary resonant circuit including a secondary coil to be magnetically coupled with the primary coil, and a secondary capacitor; a rectifier circuit that rectifies AC power outputted from the secondary resonant circuit; an immittance circuit connected between the rectifier circuit and the secondary resonant circuit; a load to which a DC power outputted from the rectifier circuit is supplied; a protection switch of which the state is changed to be in a conductive state or a non-conductive state, thereby causing the secondary resonant circuit to be in a non-resonant state; and a secondary side control circuit that sets the state of the protection switch to be in either the conductive state or the non-conductive state. The primary side control circuit is configured to change the impedance of the variable impedance element, using a detection value of the primary detection circuit which changes depending on the state of the protection switch being set to be in the conductive state or the non-conductive state, thereby causing the reception apparatus to be in the standby state from the transmission state.

BRIEF DESCRIPTION OF THE DRAWINGS

The above-described objects and other objects, features and advantages of the present disclosure will be clarified further by the following detailed description with reference to the accompanying drawings. The drawings are:

FIG. 1 is a diagram showing an overall configuration of a contactless power supply system;

FIG. 4 is a circuit diagram showing a contactless power supply system according to a second embodiment;

DETAILED DESCRIPTION OF THE PREFERRED EMBODIMENTS

Figure 2:
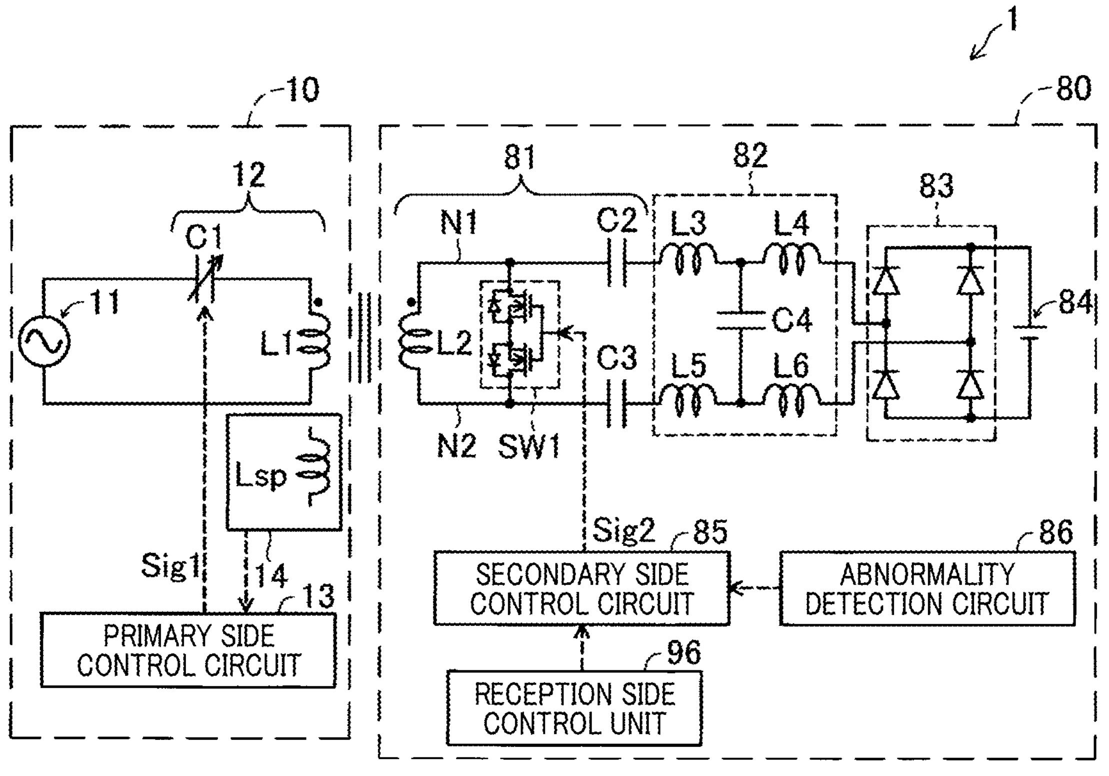
FIG. 2 is a circuit diagram showing a contactless power supply system according to a first embodiment.

Conventionally, a technique is disclosed for a power reception apparatus supplied with power from a power transmission apparatus in a contactless manner, for protecting a load to be supplied with the received power when an abnormality occurs (e.g. JP-2022-533250). According to the above-mentioned patent literature JP-2022-533250, a transistor included in a rectifier is controlled to be ON, and thereafter, a relay disposed on a current path from a resonator coil to the rectifier is controlled to be opened, thereby protecting the load. Since the power transmission apparatus continues to transmit power even after the power reception apparatus stops receiving the power, a power loss possibly occurs in the power transmission apparatus.

Hereinafter, embodiments of the present disclosure will be described.

A. First Embodiment

A1. Configuration of Contactless Power Supply System

As shown in FIG. 1, the contactless power supply system 1 is provided with a power transmission apparatus 10 and a power reception apparatus 80. According to the present embodiment, the transmission apparatus 10 is buried under the road RS. The reception apparatus 80 is mounted on a vehicle VE as a mobile body travelling on the road RS. The reception apparatus 80 is supplied with power from the transmission apparatus 10 during the traveling of the vehicle VE. Here, 'during traveling' includes a case where the vehicle VE is moving and a case where the vehicle is stopped when waiting for a traffic light to change. The vehicle VE is configured as an electric vehicle or a hybrid vehicle.

The transmission apparatus 10 includes a primary resonant circuit 12 having a primary coil L1 and an AC power source 11 that supplies power to the primary resonant circuit 12. The AC power source 11 supplies power to a plurality of primary resonant circuits 12. The plurality of primary coils L1 are arranged along a direction with which the road RS extends.

The mobile body having the reception apparatus mounted thereon is not limited to the vehicle VE traveling on the road RS, but may be an AGV (automatic guided vehicle) or a mobile robot. Further, the transmission apparatus 10 may be installed not only under the road RS but also installed on a sidewalk next to the road RS or in a parking lot or on a route where the AGV travels.

The reception apparatus 80 is provided with a battery 84 as a load, an auxiliary battery 94, a rectifier circuit 83, a secondary resonant circuit 81 having a secondary coil L2 magnetically coupled to a primary coil L1, a DC-DC converter 92, an inverter 91, a motor generator 93, an auxiliary equipment 95 and a reception side control unit 96. According to the present embodiment, the secondary coil L2 is disposed on a lower surface of the vehicle VE, facing the primary coil L1.

The rectifier circuit 83 is connected to the secondary resonant circuit 81. During the reception state, the rectifier circuit 83 rectifies the AC power received by the secondary resonant circuit 81 and supplies the rectified DC power to the battery 84, the DC-DC converter 92 and the inverter 91.

The battery 84 is a secondary battery charged by the supplied DC power. The inverter 91 utilizes the supplied DC power to drive the motor generator 93. The motor generator 93 operates as a three-phase AC motor to produce a driving force for travelling. In addition, the motor generator 93 operates as a generator when the vehicle VE decelerates to regenerate the power. The regenerated three-phase AC power is converted to DC power by the inverter 91 and is used for a charging of the battery 84.

The DC-DC converter 92 steps-down the DC power supplied from the rectifier circuit 83 and supplies the stepped-down DC power to the auxiliary battery 94 and the auxiliary equipment 95. The auxiliary equipment 95 includes an air-conditioner, an electric power steering apparatus, peripheral apparatuses of the vehicle VE such as a head lamp, a direction indicator and a wiper, and an accessory of the vehicle VE. The auxiliary battery 94 serves as a secondary battery for driving the auxiliary battery 95.

The reception side control unit 96 controls respective units such as the inverter 91 in the reception apparatus 80. The reception side control unit 96 is configured at least including an ECU (engine control unit). Note that the ECU may be configured of a single microcontroller or may be configured including a plurality of microcontrollers. A case where the ECU is configured including a plurality of microcontroller refers to a case where a microcontroller that controls a configuration such as the motor generator 93 related to a driving of the vehicle VE, and a microcontroller that controls a configuration related to the battery 84 such as the rectifier circuit 83 are included.

A2. Circuit Configuration of Contactless Power Supply System:

As shown in FIG. 2, the transmission apparatus 10 is provided with, in addition to the above-described configuration, a primary capacitor C1, a primary side control circuit 13, a magnetic flux detection circuit 14 as a primary detection circuit. In FIG. 2, among the plurality of primary resonant circuits 12 connected to the AC power source 11, only one of the primary resonant circuit 12 is shown and the illustration of other primary resonant circuits 12 are omitted.

The AC power source 11 applies an AC power having a predetermined operating frequency to the primary resonant circuit 12. According to the present embodiment, the operating frequency is 85 KHz. The primary capacitor C1 as a variable impedance element is utilized to cause the primary resonant circuit 12 to be in a resonant state with the operating frequency and cause the primary resonant circuit 12 to be in a non-resonant state with the operating frequency. The primary capacitor C1 is connected to a portion between the primary coil L1 and the AC power source 11. The primary capacitor C1 changes the state of the transmission apparatus 10 between a standby state and a transmission state which will be described later.

According to the present embodiment, the primary capacitor C1 is configured to be capable of changing the capacitance between a first capacitance and a second capacitance smaller than the first capacitance. Then, the capacitance of the primary capacitor C1 is changed, in response to a switch signal Sig1 outputted from the primary side control circuit 13, to be either the first capacitance or the second capacitance. In the case where the primary coil L1 and the secondary coil are magnetically coupled to each other and the primary capacitor C1 has the first capacitance, the primary resonant circuit 12 is in a resonant state with the operating frequency. That is, the first capacitance of the primary capacitor C1 is set such that the resonant frequency of the primary resonant circuit 12 is the same as the operating frequency. However, in the case where the primary capacitance C1 has the second capacitance, since the resonant frequency of the primary resonant circuit 12 deviates from the operating frequency, the primary resonant circuit 12 is in the non-resonant state with the operating frequency The primary coil L1 and the primary capacitor C1 are connected in series to constitute the primary resonant circuit 12. The magnetic flux detection circuit 14 detects a magnitude of the magnetic flux in the vicinity of the primary coil L1. Specifically, the magnetic flux detection circuit 14 incorporates a detection coil Lsp disposed in the vicinity of the secondary coil L2, and detects the magnitude of the magnetic flux density using a change in the current flowing through the detection coil Lsp. The magnetic flux detection circuit 14 outputs a signal indicating the magnitude of the detected magnetic flux to the primary side control circuit 13.

The primary side control circuit 13 uses a signal outputted from the magnetic flux detection circuit 14, thereby outputting the switch signal Sig1 to the primary capacitor C1.

Note that the primary detection circuit is not limited to the magnetic detection circuit 14 that detects a magnitude of the magnetic flux density, but may be a sensor capable of detecting a magnitude of the magnetic flux interlinking with the primary coil L1. Specifically, the primary detection circuit may be a current sensor that detects current flowing through the primary coil L1 or a voltage sensor that detects voltage of the primary coil L1. Note that 'detecting magnitude of magnetic flux interlinking with the primary coil L1' refers to not only a case where entire magnetic flux interlinking with the primary coil L1 is detected but also a case where a part of the magnetic flux interlinking with the primary coil L1 is detected according to the present embodiment.

The reception apparatus 80 includes, in addition to the above-described configurations, secondary capacitors C2 and C3, an immittance circuit 82, a secondary side control circuit 85 and an abnormality detection circuit 86. The secondary capacitor C2 is series-connected to one end of the secondary coil L2 and the secondary capacitor C3 is series-connected to the other end of the secondary coil L2, thereby constituting the secondary resonant circuit 81. As another embodiment of the secondary resonant circuit 81, the secondary resonant circuit 81 may include either the secondary capacitor C2 or the secondary capacitor C3.

The immittance circuit 82 is connected to a portion between the secondary resonant circuit 81 and the rectifier circuit 83. In the case where an AC power having the resonant frequency of the immittance circuit 82 is transmitted to the immittance circuit 82, the immittance circuit 82 serves as an impedance-admittance conversion unit. In the case where an AC power having a frequency different from the resonant frequency of the immittance 82 is transmitted to the immittance circuit 82, the immittance circuit 82 serves as a low-pass filter.

According to the present embodiment, the immittance circuit 82 includes coils L3 to L6 and a capacitor C4. The coils L3 and L4 are series-connected to a first feeding line N1 connected to one end of the secondary coil L2. The coils L5 and L6 are series-connected to a second feeding line N2 connected to the other end of the secondary coil L2. The capacitor C4 is connected to a connection point between the coil L3 and the coil L4 and a connection point between the coil L5 and the coil L6, and is connected in parallel to the coil L2.

The secondary resonant circuit 81 further includes a protection switch SW1. The protection switch SW1 is connected in parallel to the secondary coil L2. Thus, compared to a case where the protection switch SW1 is series-connected to the secondary coil L2, that is, the protection switch SW1 is inserted to the first feeding line N1 or the second feeding line N2, a power loss can be reduced and the rated current of the protection switch SW1 can be smaller. The conductive state of the protection switch SW1 causes the secondary resonant 81 to be in a non-resonant state. According to the present embodiment, the protection switch SW1 is accomplished by a bi-directional switch configured of two MOSFETs of which the respective source terminals are connected together. Thus, the size of the protection switch SW1 can be reduced.

The secondary side control circuit 85 changes the state of the protection switch SW1 between the conductive state and the non-conductive state. According to the present embodiment, the secondary side control circuit 85 changes the voltage of the signal Sig2 to be inputted to the gate terminals of two MOS FETs that constitutes the protection switch SW1, thereby changing the state of the protection switch SW1.

The rectifier circuit 83 is configured of a diode-bridge circuit.

The abnormality detection circuit 86 detects a state of abnormality in the reception apparatus 80. Specifically, the abnormality detection circuit 86 includes a voltage sensor (not shown) that detects the voltage of the battery 84, determines an abnormality in the case where the voltage of the battery 84 is outside a predetermined voltage range and outputs an abnormality signal to a secondary side control circuit 85.

The reception side control unit 96 outputs a stop signal to the secondary side control circuit 85 when inhibiting a power supply to the battery 84 from the secondary resonant circuit 81. The reception side control unit 96 outputs a stop signal when determining that the state of the battery 84 is not appropriate for charging.

In the case where the primary coil L1 and the secondary coil L2 are magnetically coupled, the resonant frequency of the primary resonant circuit 12 and the resonant frequency of the second resonant circuit 81 are set to be substantially the same. Thus, with a magnetic field resonant between the primary coil L1 and the secondary coil L2, contactless power supply can be accomplished for the reception apparatus 80. As described above, the DC power outputted from the secondary resonant circuit 81 is rectified by the rectifier circuit 83 and the rectified DC power is supplied to the battery 84.

A3. Power Supply Sequence

The primary coils L1 are arranged in a direction where the road RS extends, the secondary coil L2 is supplied with power from the closest primary coil L1 in a contactless manner, that is, contactless power supply.

The transmission apparatus 10 causes a standby current to flow through the primary coil L1 in the standby state, thereby producing magnetic flux at the primary coil L1. When the secondary coil L2 approaches the primary coil L1, the reception apparatus 80 utilizes a secondary side detection circuit (not shown) to detect magnetic flux produced by the primary coil L1. The reception apparatus 80 produces, when detecting magnetic flux produced by the primary coil L1, activation flux at step S1 shown in FIG. 3. Specifically, the reception apparatus 80 applies AC power to a flux-producing coil (not shown). Thus, the flux-producing coil produces magnetic flux.

Note that the method executed by the reception apparatus 80 to detect the closest primary coil L1 is not limited to the above-described method. For example, a camera included in the reception apparatus 80 may capture an identifier indicated at a portion in the vicinity of the primary coil L1, thereby detecting the closest primary coil L1.

Figure 3:
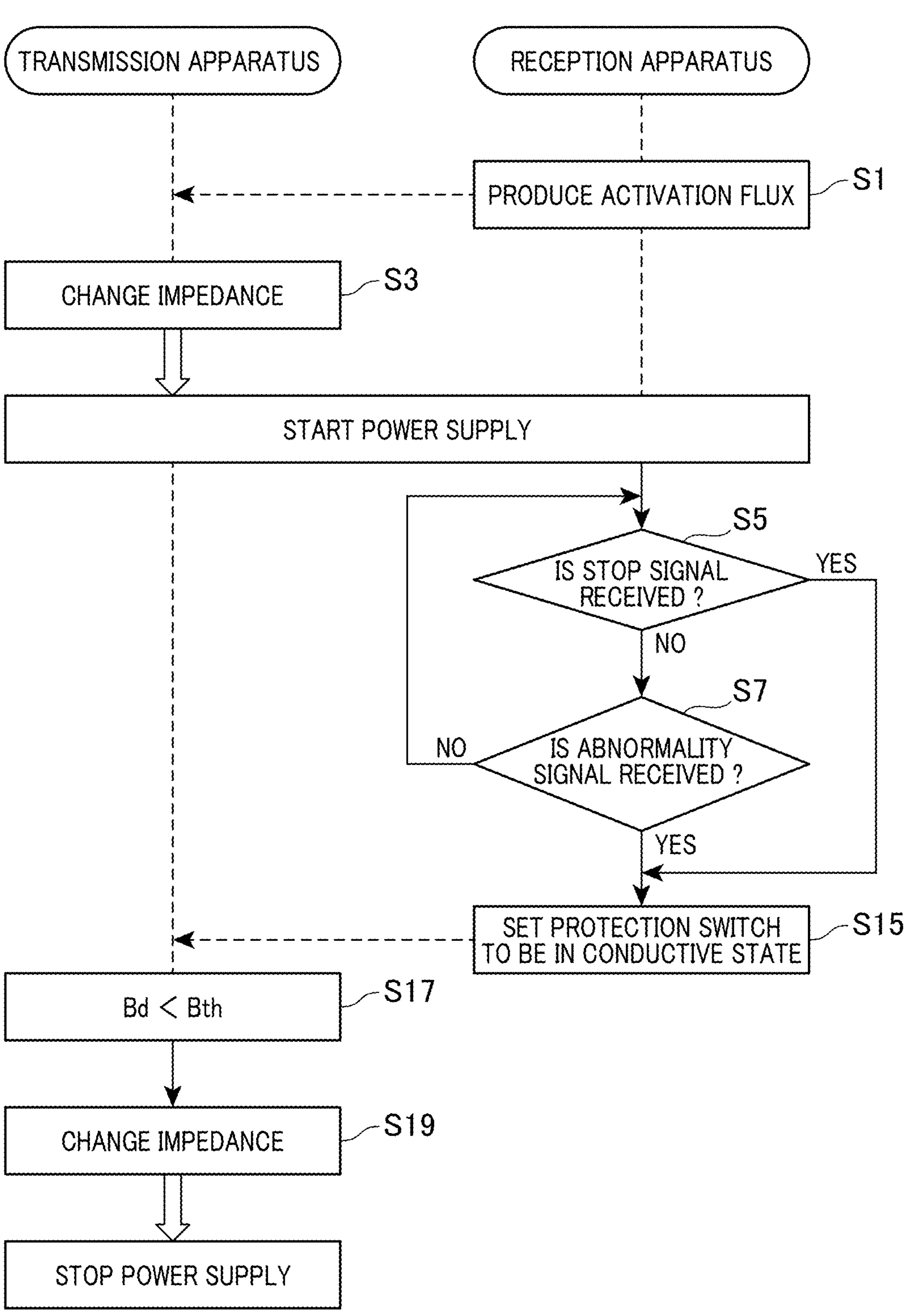
FIG. 3 is a flowchart showing a power supply sequence according to the first embodiment.

The primary side control circuit 13 changes, when determining that the magnetic flux density indicated by a signal outputted from the magnetic flux detection circuit 14 is larger than a threshold, the impedance of the primary capacitance C1 as a variable impedance element at step S3 shown in FIG. 3. Specifically, the primary side control circuit 13 outputs the switch signal Sig1 to the primary capacitor C1. Thus, the capacitance value of the primary capacitor C1 is changed to the first capacitance from the second capacitance. Thus, the primary side resonant circuit 12 is in a resonant state at the operating frequency, activating the transmission state that causes the transmission current to flow through the primary coil L1, thereby starting the power supply operation. Thus, the transmission apparatus 10 changes the state from the standby state to the transmission state in the case where the magnetic flux detection circuit 14 detects an increase in the magnetic flux in the vicinity of the primary coil L1. The transmission apparatus 10 changes the state from the standby state to the transmission state at a time when the capacitance value of the primary capacitor C1 is changed. Similarly, the reception apparatus 80 changes the state from the non-power reception state to the power reception state at a time when the capacitance value of the primary coil L1 is changed. During the power reception state of the reception apparatus 80, the protection switch SW1 is set to be in a non-conductive state.

As shown in FIG. 3, the secondary side control circuit 85 of the reception apparatus 80 determines whether a stop signal as a power supply stop signal is received at step S5 after activating the power reception. When determining that the stop signal is received, the secondary side control circuit 85 determines, at step S7, whether an abnormality signal as a power supply stop signal is received. When determining that the abnormality signal is not received, the secondary side control circuit 85 returns to step S5.

On the other hand, when determining that the stop signal is received at step S5 and determining that an abnormality signal is received at step S7, the secondary side control circuit 85 sets the protection switch SW1 to be in the conductive state at step S15. In more detail, the secondary side control circuit 85 changes the state of the protection switch SW1 from the non-conductive state to the conductive state. Specifically, the secondary side control circuit 85 outputs a high level of signal Sig2 to the protection switch SW1. Thus, the protection switch SW1 is in the conductive state and one end of the secondary coil L1 and the other end of the secondary coil L2 are short-circuited. Hence, the impedance of the secondary resonant circuit 81 becomes higher and the current flowing through the secondary coil L2 becomes smaller. Accordingly, since the current supplied to the battery 84 decreases, the battery 84 can be protected. Also, one end and the other end of the secondary coil L2 are short-circuited, thereby causing the secondary coil L2 to serve as a cancel coil that cancels the magnetic flux produced by the primary coil L1.

The impedance Z of the secondary resonant circuit 81 when the protection switch SW1 is in a non-conductive state is expressed by an equation (1), where an inductance of the secondary coil L2 is L, the capacitance of the secondary capacitor C2 is C/2, the capacitance of the secondary capacitor C3 is C/2, and the resistance of the resistance component of the secondary resonant circuit 81 is r.

$$Z = r + j(\omega L - 1/\omega C) \qquad (1)$$

Note that j indicates an imaginary unit and @ indicates an angular frequency in the equation (1). The frequency at which the imaginary unit j in the equation (1) is 0 refers to the resonant frequency. When the protection switch SW1 is in a conductive state, the impedance value of the secondary resonant circuit 81 is different from that obtained from the equation (1).

Hence, in the case where AC power having the resonant frequency is transmitted to the secondary resonant circuit 81, the imaginary unit in the equation (1) is not 0, and the impedance of the secondary resonant circuit 81 becomes higher. Therefore, the current flowing through the secondary coil L2 is lower than a current flowing through the secondary coil L2 in the case where the protection switch SW1 is in a non-conductive state.

The input impedance of the primary resonant circuit 12 increases in response to an increase in the impedance of the secondary resonant circuit 81. Thus, the current flowing through the primary coil L1 decreases and the magnetic flux density detected by the magnetic flux density detection circuit 14 becomes smaller. The primary side control circuit 13 outputs, at step S19, the switch signal Sig1 that changes the capacitance of the primary capacitor C1 to be the second capacitance, when determining, at step S17, that the detection value Bd of the magnetic flux density indicated by a signal outputted from the magnetic flux detection circuit 14 is smaller than a reference magnetic flux density Bth. Thus, the primary resonant circuit 12 is in the non-resonant state at the operating frequency and the power transmission is stopped. Hence, even in the case where the reception apparatus 80 stops the power reception, without relying on a communication, the power transmission can be stopped. Thus, power consumption which does not contribute the power supply in the transmission apparatus 10 can be reduced.

According to the first embodiment described above, the reception apparatus 80 includes a protection switch SW1. Hence, the protection switch SW1 is used to protect the battery 84 by lowering the current flowing through the secondary coil L2 when the reception apparatus 80 is in an abnormality state. During the power transmission state, when the magnetic flux in the vicinity of the primary coil L1 is small, the primary side control circuit 13 changes the capacitance of the primary capacitor C1 to change the impedance of the primary resonant circuit 12 to be higher, thereby changing the state to be the standby state. Thus, power consumption which does not contribute the power supply in the transmission apparatus 10 can be reduced.

B. Second Embodiment

Figure 4:
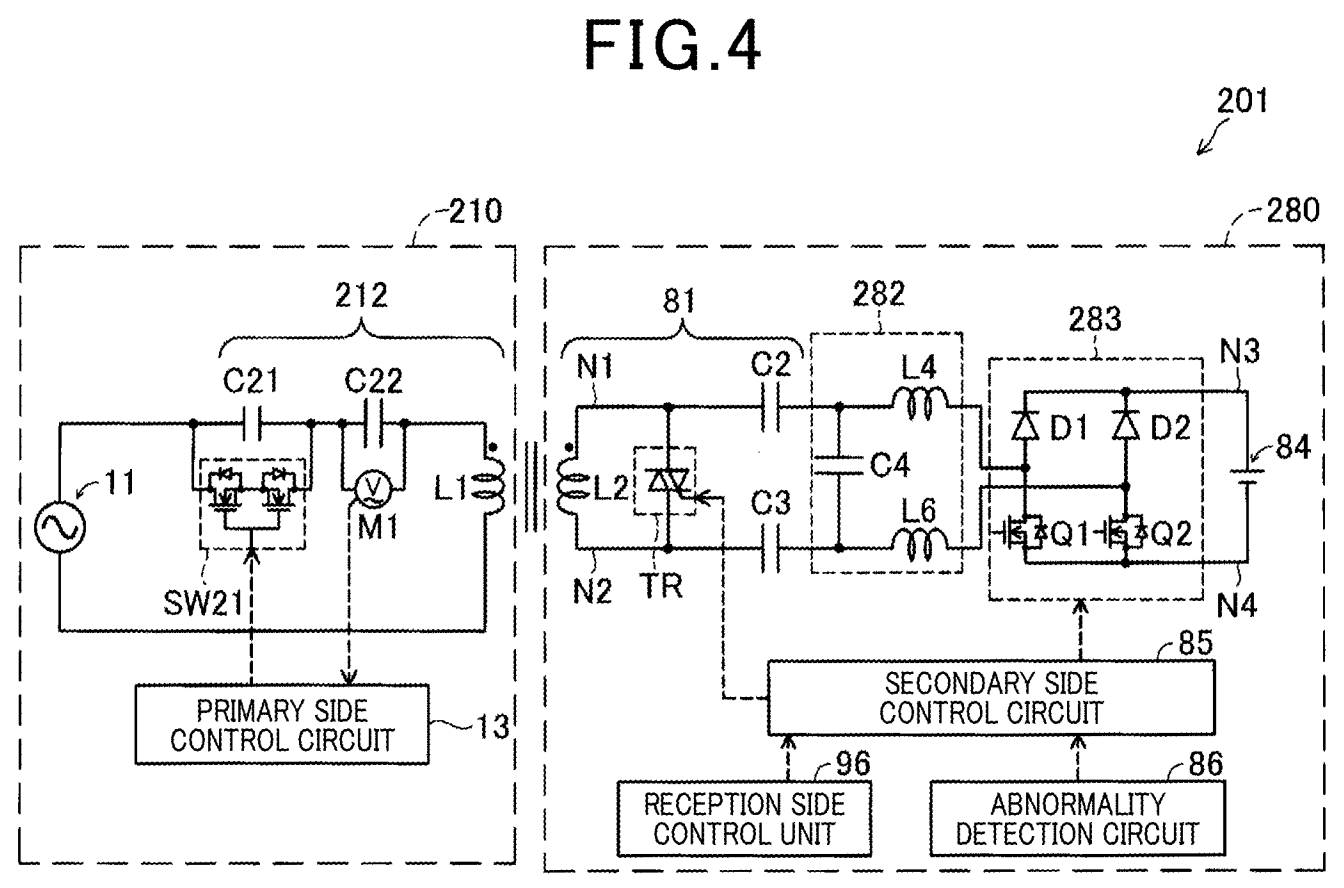

As shown in FIG. 4, the contactless power supply system 201 differs from the above-described first embodiment in that the configuration of the primary resonant circuit 12, the configuration of the immittance circuit 282, the configuration of the rectifier circuit 283, configuration of the protection switch and the power supply sequence are different. For configurations and process steps same as those in the first embodiment, the same reference symbols are applied and detailed explanation will be omitted.

The primary resonant circuit 212 includes a first capacitor C21, a second capacitor C22 and a primary coil L1. The first capacitor C21 and the second capacitor C22 are connected in series to the primary coil L1. The capacitance of the first capacitor C21 is smaller than the capacitance of the second capacitor C22. Further, the transmission apparatus 210 includes a switch SW21 that bypasses the first capacitor C21. During a power-transmission state of the transmission apparatus 210, the switch SW21 as a variable impedance element is set to be in a conductive state. During a standby state of the transmission apparatus 210, the switch SW21 is set to be in a non-conductive state. In the case where the switch SW21 is set to be in the conductive state, the capacitance of the second capacitor C22 is set to be a value that allows the primary coil L1 to be in a resonant state at the operating frequency. Once the switch SW21 is set to be in the non-conductive state, the impedance of the primary resonant circuit 212 becomes higher and a standby current smaller than the transmission current flows through the primary coil L1.

According to the present embodiment, instead of the magnetic flux detection circuit 14 of the first embodiment, a voltage sensor M1 as a primary detection circuit is provided. The voltage sensor M1 is used to detect a magnitude of magnetic flux interlinking with the primary coil. Specifically, the voltage sensor M1 detects the voltage of the second capacitor C22 and outputs a signal indicating the detection value to the primary side control circuit 13. The detection value of the voltage sensor M1 is a voltage value such that the larger the current value flowing through the primary coil L1, the larger the voltage value is. Therefore, similar to the first embodiment, current flowing through the secondary coil L2 in the reception apparatus 280 can be prevented from decreasing.

The immittance circuit 282 according to the present embodiment differs from the first embodiment in that the coil L3 and the coil L5 of the immittance circuit 83 of the first embodiment are not provided. According to the present embodiment, a leakage inductance of the secondary coil L2 is utilized similar to the coil L3 and the coil L5 of the immittance circuit 82 of the first embodiment. In other word, the immittance circuit 282 functions as an immittance circuit with the leakage inductance of the secondary coil L2, the coils L4 and L6 and the capacitor C4.

The rectifier circuit 283 according to the present embodiment is configured such that two diodes among four diodes in the diode bridge are replaced by two switching elements. Specifically, the rectifier circuit 283 includes diodes D1 and D2, and switching elements Q1 and Q2 as a switch. The diodes D1 and D2 constitute an upper arm connected to a positive electrode side supply line N3 connected to the positive electrode of the battery 84. The switching elements Q1 and Q2 constitute a lower arm connected to a negative electrode side supply line N4 connected to the negative electrode of the battery 84. The switching elements Q1 and Q2 are complementarily driven. A control signal outputted from the secondary side control circuit 85 is transmitted to each of the gate terminals of the switching elements Q1 and Q2. According to the present embodiment, the switching elements Q1 and Q2 are each configured of MOSFET. According to the present embodiment, as a protection switch, a triac TR. A signal outputted from the secondary side control circuit 85 is transmitted to the gate terminal of the triac TR.

Figure 5:
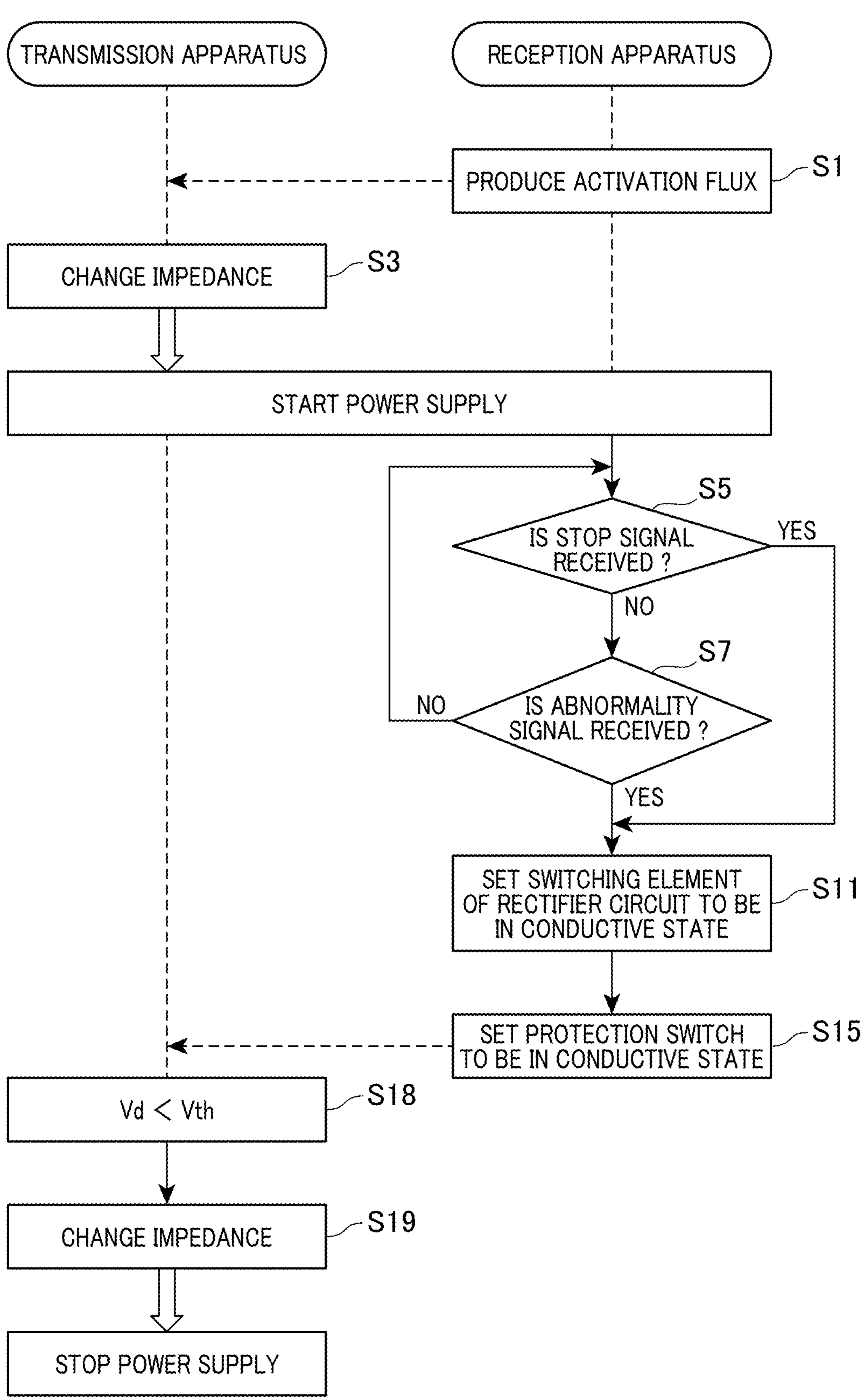
FIG. 5 is a flowchart showing a power supply sequence according to the second embodiment.

As shown in FIG. 5, when determining that the stop signal is received at step S5 and determining that an abnormality signal is received at step S7, the secondary side control circuit 85 sets, at step S11, the switching elements Q1 and Q2 of the rectifier circuit 283 to be in the conductive state. Thus, since the first feeding line N1 and the second feeding line N2 are short-circuited via the switching elements Q1 and Q2, the current supplied to the battery 84 can be lowered. Hence, the battery 84 can be prevented from being applied with an excessive current and an excessive voltage, thereby protecting the battery 84. Since the immittance circuit 282 serves as a constant current source when viewing from the output side, even in the case where the switching elements Q1 and Q2 are set to be in the conductive state to cause a short-circuit between two output nodes of the immittance circuit 282, unlike a constant voltage source, an excessive current can be prevented from flowing. Accordingly, the battery 84 can be protected while preventing the switching elements Q1 and Q2 from being applied with excessive current and voltage.

The secondary side control circuit 85 changes, at step S15, the state of the triac TR as a protection switch to be in the conductive state. Thus, similar to the first embodiment, current flowing through the secondary coil L2 can be reduced. The states of the switching elements Q1 and Q2 are set to be in the conductive state before changing the state of the triac TR to be in the conductive state, whereby the battery 84 can be protected earlier.

The primary side control circuit 13 outputs, at step S19, a high level signal for setting the switch SW21 to be in a conductive state, when determining, at step S17, that the voltage value V d indicated by the signal outputted from the voltage sensor M1 is lower than the reference voltage Vth. Thus, the primary side resonant circuit 212 is in a non-resonant state at the operating frequency and the power transmission is stopped.

According to the above-described second embodiment, advantageous effects same as those in the first embodiment can be obtained. Moreover, while the protection switch SW1 is being changed to be in a conductive state, the switching elements Q1 and Q2 of the rectifier circuit are set to be in the conductive state, whereby the battery 84 can be protected earlier.

C. Third Embodiment

Figure 6:
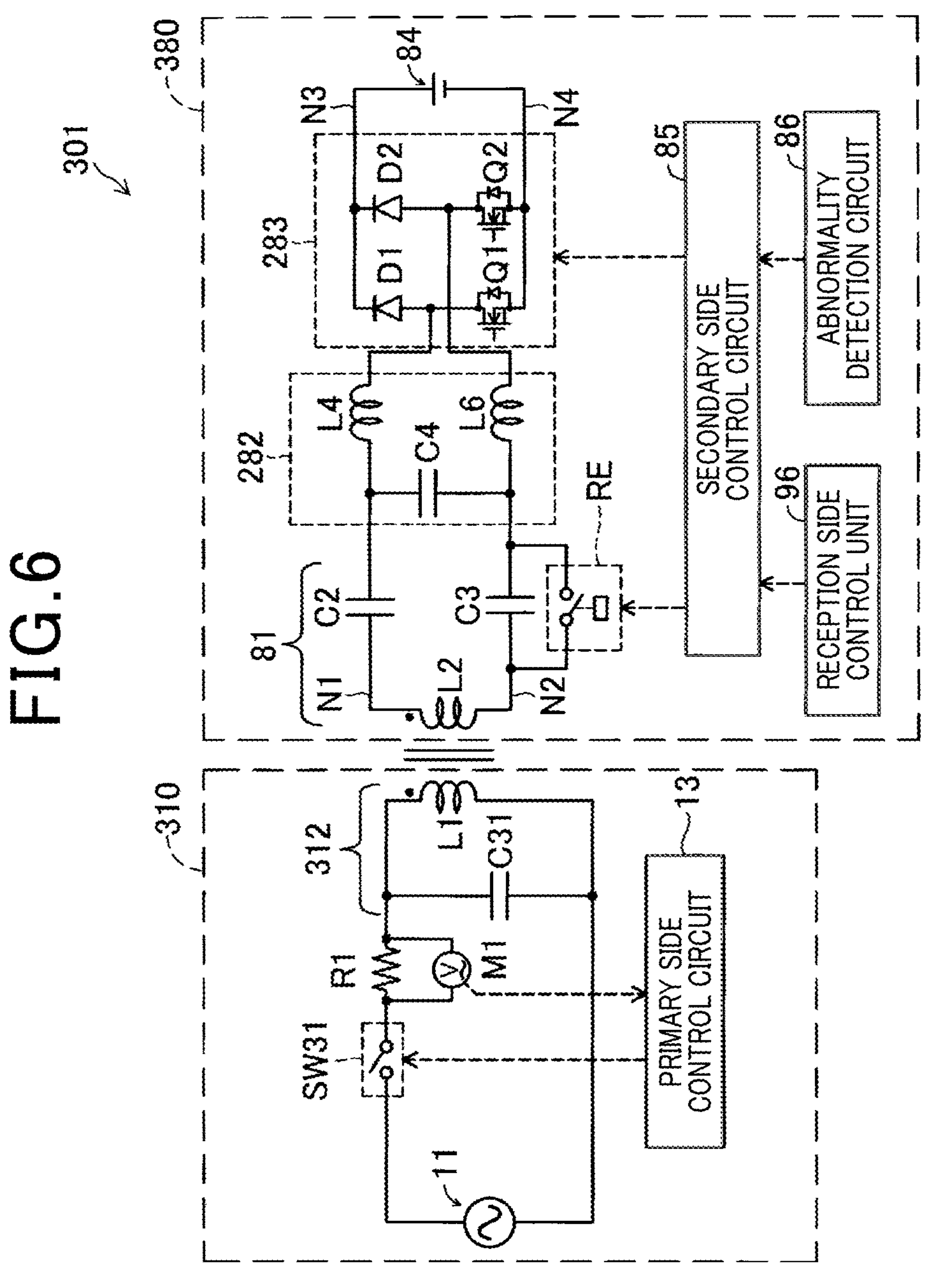
FIG. 6 is a circuit diagram showing a contactless power supply system according to a third embodiment.

As shown in FIG. 6, the contactless power supply system 301 according to the present embodiment differs from the above-described embodiments in that the configuration of the primary resonant circuit 312 of the transmission apparatus 310, the circuit configuration of the reception apparatus 380, the configuration of the protection switch and the power supply sequence are different. For configurations and process steps same as those in the first embodiment, the same reference symbols are applied and detailed explanation will be omitted.

The primary resonant circuit 312 according to the present embodiment is configured such that a primary capacitor C31 is connected in parallel to a primary coil L1. The transmission apparatus 310 according to the present embodiment further includes a resistor R1. The resistor R1 is connected in series to the primary coil L1.

According to the present embodiment, the voltage sensor M1 as the primary detection circuit detects the voltage across the resistor R1 and outputs the signal indicating the detection value to the primary side control circuit 13. The detection value of the voltage sensor M1 changes such that the larger the current value of the current flowing through the primary coil L1, the larger the detection value is. Hence, similar to the first embodiment, current flowing through the secondary coil L2 in the reception apparatus 280 can be prevented from decreasing. The transmission apparatus 310 may include a coil instead of the resistor R1. In this case, the voltage sensor M1 detects voltage across the coil.

According to the present embodiment, the switch SW31 as the variable impedance element is connected in series to the primary coil L1. In the case where the switch 31 is in a non-conductive state, the impedance of the switch 31 becomes higher, causing a non-resonant state of the primary resonant circuit 312.

The reception apparatus 380 includes a semiconductor relay RE as a protection switch. According to the present embodiment, the semiconductor relay RE bypasses the secondary capacitor C3. The semiconductor relay RE may be connected to bypass the secondary capacitor C2 not the secondary capacitor C3.

Figure 7:
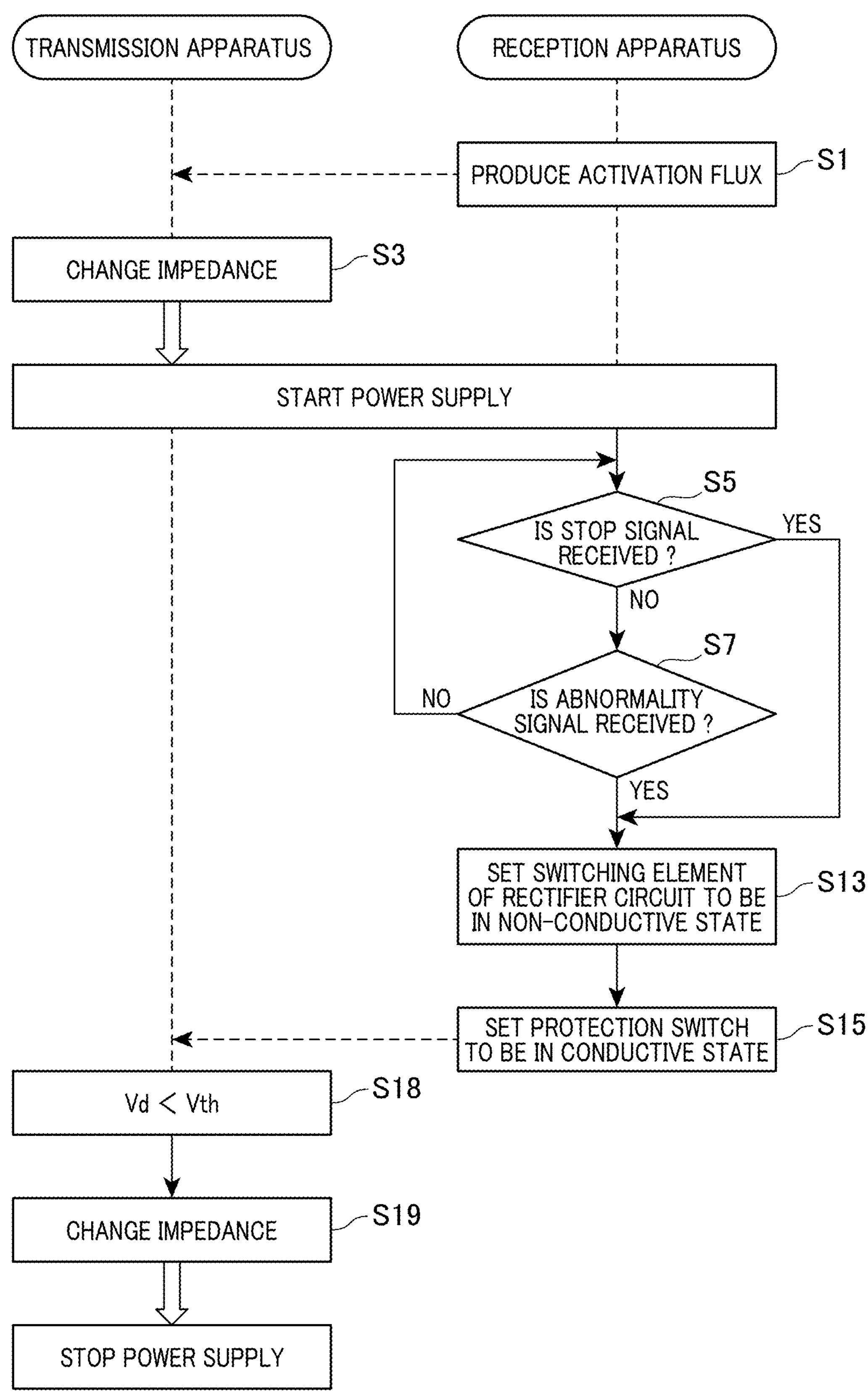
FIG. 7 is a flowchart showing a power supply sequence according to the third embodiment.

As shown in FIG. 7, when determining that the stop signal is received at step S5, or determining that an abnormality signal is received at step S7, the secondary side control circuit 85 sets, at step S13, the switching elements Q1 and Q2 of the rectifier circuit 283 to be in a non-conductive state. The secondary side control circuit 85 changes the state of the semiconductor relay RE to be in a conductive state at step S15. Since the semiconductor relay RE is connected in parallel to the secondary capacitor C3, assuming that the semiconductor relay RE changes the state to be in the conductive state during the switching elements Q1 and Q2 of the rectifier circuit 28 being in the conductive state, excessive current possibly flows through the secondary coil L2. In this respect, the semiconductor relay RE is changed to be in the conductive state during the switching elements Q1 and Q2 being in the non-conductive state. Hence, the secondary coil L2 can be prevented from being damaged.

According to the above-described third embodiment, advantageous effects same as those in the above-described embodiments can be obtained. Moreover, the semiconductor relay RE is changed to be in the conductive state during the switching elements Q1 and Q2 being in the non-conductive state, whereby the secondary coil L2 can be prevented from being damaged.

D. Fourth Embodiment

Figure 8:
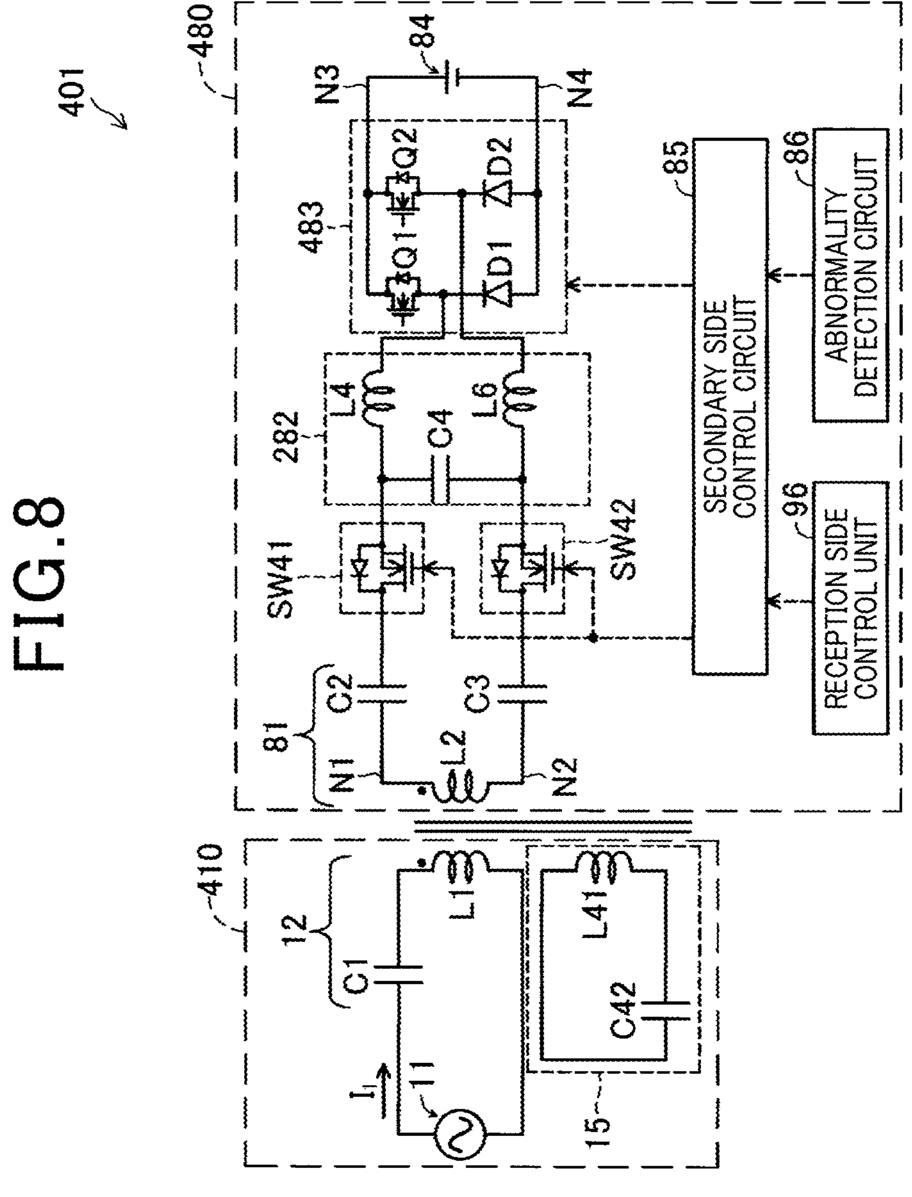
FIG. 8 is a circuit diagram showing a contactless power supply system according to a fourth embodiment.

As shown in FIG. 8, the contactless power supply system 401 according to the present embodiment differs from the above-described respective embodiments in that the circuit configuration of the transmission apparatus 410 and the circuit configuration of the reception apparatus 480 are different. For configurations and process steps same as those in the first embodiment, the same reference symbols are applied and detailed explanation will be omitted.

The transmission apparatus 410 includes a characteristics changing circuit 15. The characteristics changing circuit 15 is a closed circuit in which the coil L41 and the capacitor C42 are connected in series. The coil L41 is disposed in a location capable of being magnetically coupled with the primary coil L1. The resonant frequency of the characteristics changing circuit 15 is higher than the operating frequency.

The characteristics changing circuit 15 has a function of causing a current flowing through the primary coil L1 to be smaller in the case where a distance between the primary coil L1 and the secondary coil L2 is long and a coupling coefficient between the primary coil L1 and the secondary coil L2 is small. In more detail, the capacitance of the primary capacitor C1 is set to be a value with which a resonant state is produced at the operating frequency, in the case where a target value of the coupling coefficient between the primary coil L1 and the second coil L2 is satisfied. The target value of the coupling coefficient refers to a coupling coefficient value in the case where the distance between the primary coil L1 and the secondary coil L2 is short enough (i.e. target distance) to perform a contactless power supply operation. In the case where the coupling coefficient between the primary coil L1 and the secondary coil L2 is small, the inductance of the primary resonant circuit 12 is large and the current flowing through the primary coil L1 becomes small.

The reception apparatus 480 includes two protection switches SW41 and SW42. The protection switches SW41 and SW42 are semiconductor switches. According to the present embodiment, the protection switches 41 and 42 are integrated into a single MOSFET. The protection switch SW41 is inserted into the first feeding line N1. The protection switch SW42 is inserted into the second feeding line N2.

As other embodiments of the protection switches SW41 and SW42, a bi-directional switch having two MOSFETs may be utilized. Also, an embodiment may be employed in which the protection switch is inserted into only either the first feeding line N1 or the second feeding line N2.

The rectifier circuit 483 includes two diodes that constitute the lower arm, and two switching elements Q1 and Q2.

Similar to the first embodiment, when determining that the stop signal is received, or an abnormality signal is received, the secondary side control circuit 85 changes the state of the protection switches SW1 and SW2 to be non-conductive state from the conductive state. Thus, since the power supply to the battery 84 is cutoff, the battery 84 can be protected.

When setting the protection switches SW41 and SW42 to be in the non-conductive state, the secondary resonant circuit 81 is in the non-resonant state, and the current flowing through the secondary coil L2 decreases. In this case, when viewing from the primary resonant circuit 12 side, it can be presumed that the secondary coil L2 is not present. Hence, the current $I_1$ flowing through the primary resonant circuit 12 is expressed by an equation (2).

$$I_1 = r_3/\left(\omega^2 \cdot L_{13}^3\right) \cdot V_1 \tag{2}$$

In the equation (2), $r_3$ is winding resistance of the coil 41, $L_{13}$ is a mutual inductance between the primary coil L1 and the coil L41, $V_1$ is an output voltage of the AC power source 11. In the equation (2), since the denominator '$\omega^2 \cdot L_{13}^3$' is sufficiently larger than the numerator '$r_3$', the current $I_1$ is substantially 0 ampere.

According to the fourth embodiment as described above, advantageous effects same as those in the above-described embodiments can be obtained.

E. Fifth Embodiment

Figure 9:
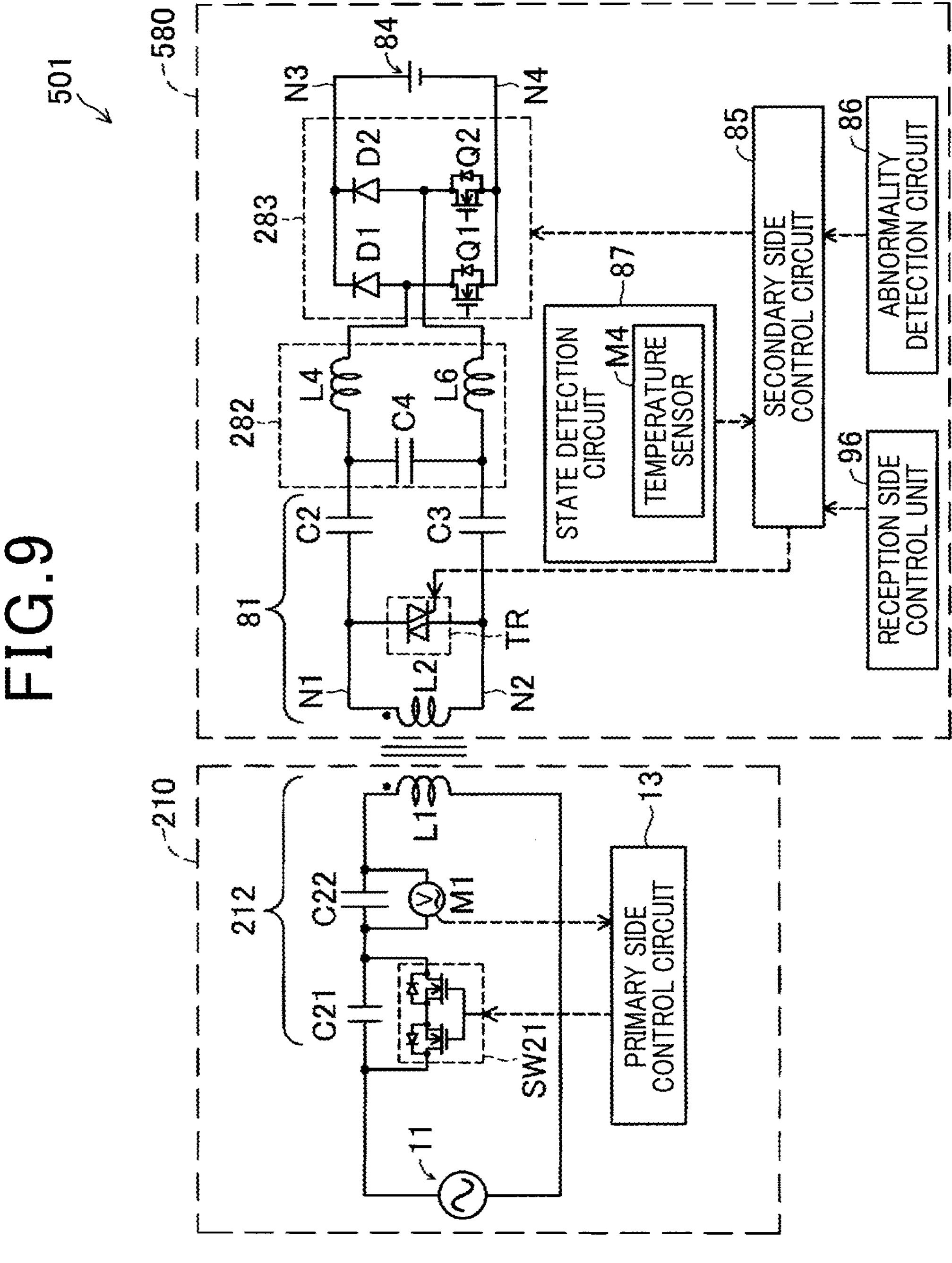
FIG. 9 is a circuit diagram showing a contactless power supply system according to a fifth embodiment.

As shown in FIG. 9, a contactless power supply system 501 according to the present embodiment differs from the above-described second embodiment in that the reception apparatus 580 is provided with a state detection circuit 87. For configurations and process steps same as those in the first embodiment, the same reference symbols are applied and detailed explanation will be omitted.

The state detection circuit 87 detects whether the state of the transmission apparatus 210 is in a standby state or a transmission state. The state detection circuit 87 includes a temperature sensor M4. The temperature sensor M4 is disposed in the vicinity of the immittance circuit 282. Note that, the temperature sensor M4 may not be disposed in the vicinity of the immittance circuit 282 but may be disposed in the vicinity of the switching elements Q1 and Q2, and may detect the temperature in the vicinity of the switching element Q1 and Q2.

The state detection circuit 87 detects a temperature of the immittance circuit 282 and outputs a signal indicating that the transmission apparatus 210 is in a transmission state to the secondary side control circuit 85, when the detected temperature Td is higher than a predetermined reference temperature Tth.

Figure 10:
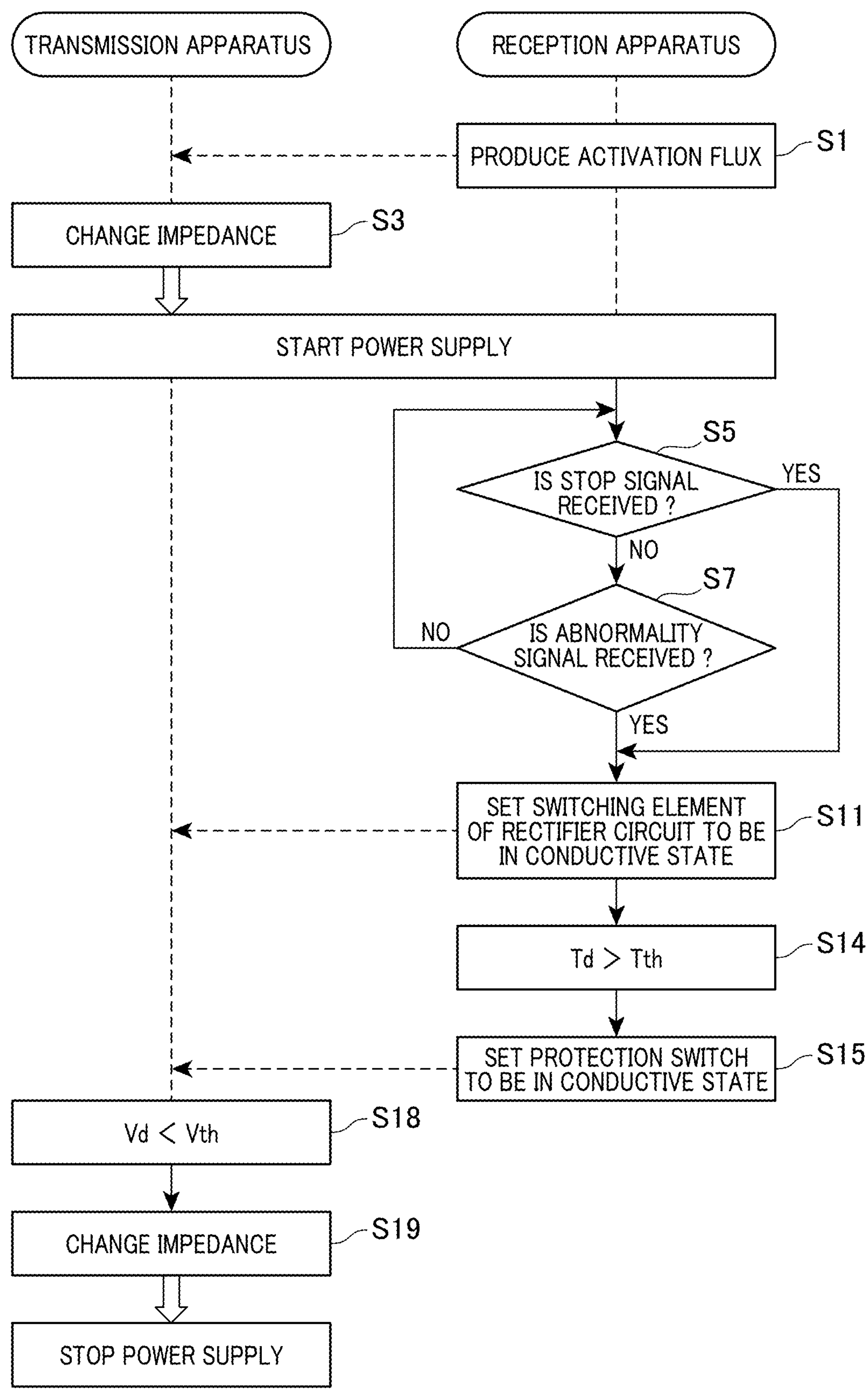
FIG. 10 is a flowchart showing a power supply sequence according to the fifth embodiment.

As shown in FIG. 10, the secondary side control circuit 85 sets, at step S11 as a first process, the switching elements Q1 and Q2 of the rectifier circuit 283 to be in the conductive state. Then, when determining that the detected temperature Td of the temperature sensor M4 is higher than the reference temperature Tth at step S14, the secondary side control circuit 85 changes the state of the triac TR as the protection switch to be in the conductive state at step S15.

At step S11, in the case where the switching elements Q1 and Q2 of the rectifier circuit 283 are set to be in the conductive state, as described above, the current flowing through the secondary coil L2 decreases. However, when the circuit constant of the primary resonant circuit 212 is deviated from the design value, with the current flowing through the primary coil L1, the detection value of the voltage sensor M1 may not be lower than the reference voltage. In this case, the transmission apparatus 210 does not move to the standby state, and since the current similar to that of the reception state flows through the primary coil L1, the temperature of the immittance circuit 282 does not decrease. In this respect, the secondary side control circuit 85 changes, when determining that the temperature Td of the temperature sensor M4 is higher than the reference temperature Tth at step S14, the triac Tr to be in the conductive state. Thus, in the case where the transmission apparatus 210 does not move to the standby state even when the switching elements Q1 and Q2 of the rectifier circuit 283 are set to be in the conductive state, the triac TR is changed to be in the conductive state, whereby the transmission apparatus 210 can be moved to the standby state. When determining that the detection temperature Td of the temperature sensor M4 is not higher than the reference temperature Tth, since the transmission apparatus 210 is already moved to the standby state after setting the switching elements Q1 and Q2 of the rectifier circuit 283 to be in the conductive state, the secondary side control circuit 85 does not change the protection switch SW1 to be in the conductive state.

According to the above-described fifth embodiment, advantageous effects the same as those in the above-described embodiments can be obtained. Further, in the case where the temperature detected by the temperature sensor M4 is higher than the reference temperature Tth and the power-supply current continues to flow through the secondary coil L2, the triac TR is changed to be in the non-conductive state at step S15, thereby causing the transmission apparatus 210 to be in the standby state.

F. Other Embodiments (F1) According to the above-descried first embodiment, so-called S-S type circuit configuration is employed in which the primary capacitor C1 is connected in series to the primary coil L1 in the primary resonant circuit 12, and the secondary capacitor C2 is connected in series to the secondary coil L2 in the secondary resonant circuit 81. However, the circuit configuration of the primary resonant circuit 12 and the circuit configuration of the secondary resonant circuit 81 are not limited to the S-S type circuit configuration.

(a) For example, P-S type circuit configuration may be employed in which the primary capacitor C1 is connected in parallel to the primary coil L1 in the primary resonant circuit 12, and the secondary capacitor C2 is connected in series to the secondary coil L2 in the secondary resonant circuit 81.

(b) Also, P-SS type circuit configuration may be employed in which a capacitor connected in parallel to the primary coil L1 is provided in addition to the primary capacitor C1 connected in series to the primary coil L1, and two secondary capacitors C2 are each connected in series to each of the both terminals of the secondary coil L2 in the secondary resonant circuit 81.

(c) Further, the primary resonant circuit 12 may include a closed circuit configured of series-connected coil and capacitor. The coil included in the closed circuit is disposed at a location capable of being magnetically coupled with the secondary coil L2 in the case where the primary coil L1 and the secondary coil L2 are magnetically coupled.

(d) Furthermore, the capacitor of the closed circuit may be connected in parallel to the coil not connected in series to the coil.

(e) Also, the primary resonant circuit 12 may be provided with a coil connected in series to the primary coil L1 and a capacitor connected in parallel to the coil. This coil is disposed at a location capable of being magnetically coupled with the secondary coil L2 in the case where the primary coil L1 and the secondary coil L2 are magnetically coupled.

(F2) According to the above-described second embodiment, the switching elements Q1 and Q2 included in the rectifier circuit 83 are embodied by MOSFETs. As other embodiment, the switching elements Q1 and Q2 may be embodied by other semiconductor elements such as IGBTs (i.e. insulated gate bipolar transistors) to which reflux diodes are connected.

(F3) According to the above-described second embodiment, for the rectifier circuit 283, the lower arm is configured of switching elements Q1 and Q2, and the upper arm is configured of a diode. As other embodiment, the rectifier circuit 283 may be embodied by a synchronous rectifier circuit in which both of the upper arm and the lower arm are configured of switching elements. In this case, the synchronous rectifier circuit is used to apply AC power to the secondary coil L2 from the battery 84. In this respect, at step S1, AC power may be applied to the secondary coil L2, whereby the secondary coil L2 functions as a coil for producing magnetic flux.

(F4) According to the above-described fifth embodiment, the state detection circuit 87 detects the temperature of the immittance circuit 282 and outputs a signal indicating that the transmission apparatus 210 is in the transmission state to the secondary side control circuit 85 in the case where the detected temperature Td is higher than the predetermined reference temperature Tth. As other embodiment of the state detection circuit 87, the detection temperature Td detected by the temperature sensor M4 at step S11 may be stored as the reference temperature, and may output a signal indicating that the transmission apparatus 210 is in the transmission state to the secondary side control circuit 85 in the case where a difference between the reference temperature and the current detected temperature is within a predetermined reference range.

(F5) According to the above-described fifth embodiment, the state detection circuit 87 detects the temperature of the immittance circuit 282 to detect the state of the transmission apparatus 210. As other embodiment, a sensor that detects current flowing through the secondary coil L2 or voltage of the secondary coil L2 may be provided so as to determine that the transmission apparatus 210 is in the transmission state in the case where the current flowing through the secondary coil L2 or the voltage of the secondary coil L2 does not decrease.

The present disclosure is not limited to the above-described embodiments and modifications, and can be realized in various configurations without departing from the spirit of the present disclosure. For example, the technical features in the embodiments and modifications corresponding to the technical features in each form described in the summary of the invention column can be appropriately replaced or combined in order to solve some or all of the above-described issues or to achieve some or all of the above-described advantageous effects. Furthermore, if a technical feature is not described as essential in this specification, it can be appropriately deleted.

The present disclosure has been described in accordance with the embodiments. However, the present disclosure is not limited to the embodiments and structure thereof. The present disclosure includes various modification examples and modifications within the equivalent configurations. Further, various combinations and modes and other combinations and modes including one element or more or less elements of those various combinations are within the range and technical scope of the present disclosure.

Other Embodiments

The features of the present disclosure will be described as follows.

(Form 1)

A contactless power supply system (1, 101-401) comprising:

a transmission apparatus (10, 210-410); and a reception apparatus (80, 280-480) to which the transmission apparatus supplies power in a contactless manner, wherein the transmission apparatus comprises:

a primary resonant circuit (12, 212, 312) including a primary coil (L1) and a primary capacitor (C1);

an AC power source (11) that supplies AC power having a predetermined operating frequency to the primary resonant circuit;

a variable impedance element (C1, SW21, SW31) connected between the primary coil and the AC power source to change a state of the transmission apparatus between a transmission state and a standby state;

a primary side control circuit (13) that changes an impedance of the variable impedance element; and a primary detection circuit (14, M1) that detects at least one of a magnitude of a magnetic flux interlinking with the primary coil and a magnitude of a magnetic flux in the vicinity of the primary coil, the reception apparatus comprises:

a secondary resonant circuit (81) including a secondary coil (L2) to be magnetically coupled with the primary coil, and a secondary capacitor (C2, C3);

a rectifier circuit (83, 283, 483) that rectifies an AC power outputted from the secondary resonant circuit;

an immittance circuit (82, 282) connected between the rectifier circuit and the secondary resonant circuit;

a load (83) to which a DC power outputted from the rectifier circuit is supplied;

a protection switch (SW1, TR, RE, SW41, SW42) of which the state is changed to be in a conductive state or a non-conductive state, thereby causing the secondary resonant circuit to be in a non-resonant state; and a secondary side control circuit (85) that sets the state of the protection switch to be in either the conductive state or the non-conductive state, and the primary side control circuit is configured to change the impedance of the variable impedance element, using a detection value of the primary detection circuit which changes depending on the state of the protection switch being set to be in the conductive state or the non-conductive state, thereby causing the reception apparatus to be in the standby state from the transmission state.

(Form 2)

The contactless power supply system according to form 1, wherein the secondary capacitor is connected in series to the secondary coil;

the protection switch is connected in parallel to the secondary coil; and the secondary side control circuit is configured to set the protection switch to be in the conductive state in response to a reception of a power supply stop signal.

(Form 3)

The contactless power supply system according to form 2, wherein the protection switch is configured as at least one of a bi-directional switch using two MOSFETs, a semiconductor relay, and a triac.

(Form 4)

The contactless power supply system according to form 2 or 3, wherein the rectifier circuit includes a rectifier switch (Q1, Q2) in at least either a lower arm or an upper arm;

the secondary side control circuit is configured to set, in response to a reception of a power supply stop signal, the rectifier switch to be in the conductive state before setting the protection switch to be in the conductive state.

(Form 5)

The contactless power supply system according to form 1, wherein the secondary capacitor is connected in series to the secondary coil;

the protection switch is connected in parallel to the secondary capacitor; and the secondary side control circuit sets the protection switch to be in the conductive state in response to a reception of the power supply stop signal.

(Form 6)

The contactless power supply system according to form 5, wherein the protection switch is configured as at least one of a bi-directional switch using two MOSFETs, a semiconductor relay, and a triac.

(Form 7)

The contactless power supply system according to form 5 or 6, wherein the rectifier circuit includes a rectifier switch (Q1, Q2) in at least either a lower arm or an upper arm;

the secondary side control circuit is configured to set, in response to a reception of a power supply stop signal, the protection switch to be in the conductive state after setting the rectifier switch to be in the non-conductive state.

(Form 8)

The contactless power supply system according to form 1, wherein the secondary capacitor is connected in series to the secondary coil;

the protection switch is a semiconductor switching element and connected in series between the secondary capacitor and the rectifier circuit; and the secondary side control circuit changes, in response to a reception of a stop power supply signal, a state of the protection switch to be in the non-conductive state.

(Form 9)

The contactless power supply system according to form 8, wherein the protection switch is a bi-directional switch using two MOSFETs.

(Form 10)

The contactless power supply system according to form 8, wherein the protection switch is configured of a single MOSFET.

(Form 11)

A contactless power supply system (501) comprising:

a transmission apparatus (210); and a reception apparatus (580) to which the transmission apparatus supplies power in a contactless manner, wherein the transmission apparatus comprises:

a primary resonant circuit (212) including a primary coil (L1) and a primary capacitor (C1);

an AC power source (11) that supplies AC power having a predetermined operating frequency to the primary resonant circuit;

a variable impedance element (SW21) connected between the primary coil and the AC power source to change a state of the transmission apparatus between a transmission state and a standby state;

a primary side control circuit (13) that changes an impedance of the variable impedance element; and a primary detection circuit (M1) that detects at least one of a magnitude of a magnetic flux interlinking with the primary coil and a magnitude of a magnetic flux in the vicinity of the primary coil, the reception apparatus comprises:

a secondary resonant circuit (81) including a secondary coil (L2) to be magnetically coupled with the primary coil, and a secondary capacitor (C2, C3);

a rectifier circuit (283) that rectifies an AC power outputted from the secondary resonant circuit, including a rectifier switch (Q1, Q2) in at least either a lower arm or an upper arm;

an immittance circuit (282) connected between the rectifier circuit and the secondary resonant circuit;

a load (84) to which a DC power outputted from the rectifier circuit is supplied;

a protection switch (TR) of which the state is changed to be in a conductive state or a non-conductive state, thereby causing the secondary resonant circuit to be in a non-resonant state;

a secondary side control circuit (85) that sets the state of the protection switch to be in either the conductive state or the non-conductive state; and a state detection circuit (87) that detects a state of the transmission apparatus, wherein the secondary side control circuit performs a first process (S11) that sets, in response to a reception of a power supply stop signal, the rectifier switch to be in the conductive state before setting the protection switch to be in the conductive state, and in the case where the state of the transmission apparatus detected by the state detection unit after performing the first process is in the transmission state, the secondary side control circuit sets the protection switch to be in the conductive state;

the primary side control circuit is configured to change the impedance of the variable impedance element, using at least one of a detection value of the primary detection circuit which changes depending on the state of the rectifier switch being set to be in the conductive state and a detection value of the primary detection circuit which changes depending on the state of the protection switch being set to be in the conductive state or the non-conductive state, thereby causing the reception apparatus to be in the standby state from the transmission state.

(Form 12)

The contactless power supply system according to form 11, wherein the state detection circuit detects a temperature of at least one of the rectifier switch and the immittance circuit, and outputs a signal indicating that the transmission apparatus is in the transmission state in the case where the detected temperature is higher than a predetermined reference temperature (Tth).

(Form 13)

A transmission apparatus (10, 210-410) that supplies power to a reception apparatus (80, 280-480) in a contactless manner, wherein the transmission apparatus comprises:

a primary resonant circuit (12, 212, 312) including a primary coil (L1) and a primary capacitor (C1);

an AC power source (11) that supplies AC power having a predetermined operating frequency to the primary resonant circuit;

a variable impedance element (C1, SW21, SW31) connected between the primary coil and the AC power source to change a state of the transmission apparatus between a transmission state and a standby state;

a primary side control circuit (13) that changes an impedance of the variable impedance element; and a primary detection circuit (14, M1) that detects at least one of a magnitude of a magnetic flux interlinking with the primary coil and a magnitude of a magnetic flux in the vicinity of the primary coil, the reception apparatus comprises:

a secondary resonant circuit (81) including a secondary coil (L2) to be magnetically coupled with the primary coil, and a secondary capacitor (C2, C3);

a rectifier circuit (83, 283, 483) that rectifies an AC power outputted from the secondary resonant circuit;

an immittance circuit (82, 282) connected between the rectifier circuit and the secondary resonant circuit;

a load (83) to which a DC power outputted from the rectifier circuit is supplied;

a protection switch (SW1, TR, RE, SW41, SW42) of which the state is changed to be in a conductive state or a non-conductive state, thereby causing the secondary resonant circuit to be in a non-resonant state;

a secondary side control circuit (85) that sets the state of the protection switch to be in either the conductive state or the non-conductive state, wherein the primary side control circuit is configured to change the impedance of the variable impedance element, using a detection value of the primary detection circuit which changes depending on the state of the protection switch being set to be in the conductive state or the non-conductive state, thereby causing the reception apparatus to be in the standby state from the transmission state.

(Form 14)

A reception apparatus (80, 280-480) supplied with power from a transmission apparatus (10, 210-410) in a contactless manner, wherein the transmission apparatus comprises:

a primary resonant circuit (12, 212, 312) including a primary coil (L1) and a primary capacitor (C1);

an AC power source (11) that supplies AC power having a predetermined operating frequency to the primary resonant circuit;

a variable impedance element (C1, SW21, SW31) connected between the primary coil and the AC power source to change a state of the transmission apparatus between a transmission state and a standby state;

a primary side control circuit (13) that changes an impedance of the variable impedance element; and a primary detection circuit (14, M1) that detects at least one of a magnitude of a magnetic flux interlinking with the primary coil and a magnitude of a magnetic flux in the vicinity of the primary coil, the reception apparatus comprises:

a secondary resonant circuit (81) including a secondary coil (L2) to be magnetically coupled with the primary coil, and a secondary capacitor (C2, C3);

a rectifier circuit (83, 283, 483) that rectifies an AC power outputted from the secondary resonant circuit;

an immittance circuit (82, 282) connected between the rectifier circuit and the secondary resonant circuit;

a load (83) to which a DC power outputted from the rectifier circuit is supplied;

a protection switch (SW1, TR, RE, SW41, SW42) of which the state is changed to be in a conductive state or a non-conductive state, thereby causing the secondary resonant circuit to be in a non-resonant state;

a secondary side control circuit (85) that sets the state of the protection switch to be in either the conductive state or the non-conductive state, wherein the primary side control circuit is configured to change the impedance of the variable impedance element, using a detection value of the primary detection circuit which changes depending on the state of the protection switch being set to be in the conductive state or the non-conductive state, thereby causing the reception apparatus to be in the standby state from the transmission state.

CONCLUSION

The present disclosure can be embodied in the following manners.

According to a first aspect of the present disclosure, a contactless power supply system is provided to include a transmission apparatus and a reception apparatus to which the transmission apparatus supplies power in a contactless manner. The transmission apparatus includes: a primary resonant circuit including a primary coil and a primary capacitor; an AC power source that supplies AC power having a predetermined operating frequency to the primary resonant circuit; a variable impedance element connected between the primary coil and the AC power source to change a state of the transmission apparatus between a transmission state and a standby state; a primary side control circuit that changes an impedance of the variable impedance element; and a primary detection circuit that detects at least one of a magnitude of a magnetic flux interlinking with the primary coil and a magnitude of a magnetic flux in the vicinity of the primary coil. The reception apparatus includes: a secondary resonant circuit including a secondary coil to be magnetically coupled with the primary coil, and a secondary capacitor; a rectifier circuit that rectifies AC power outputted from the secondary resonant circuit; an immittance circuit connected between the rectifier circuit and the secondary resonant circuit; a load to which a DC power outputted from the rectifier circuit is supplied; a protection switch of which the state is changed to be in a conductive state or a non-conductive state, thereby causing the secondary resonant circuit to be in a non-resonant state; and a secondary side control circuit that sets the state of the protection switch to be in either the conductive state or the non-conductive state. The primary side control circuit is configured to change the impedance of the variable impedance element, using a detection value of the primary detection circuit which changes depending on the state of the protection switch being set to be in the conductive state or the non-conductive state, thereby causing the reception apparatus to be in the standby state from the transmission state.

According to the first aspect, since the reception apparatus includes a protection switch, when the reception apparatus is in an abnormal state, the protection switch is used to decrease an amount of current supplied to the load, whereby the load can be protected. Further, the primary side control circuit increases the impedance of the primary resonant circuit to be higher in the case where the magnetic flux in the vicinity of the primary coil becomes smaller in the transmission state, thereby causing the state to be in the standby state. Thus, power consumption which does not contribute the power supply in the transmission apparatus can be reduced.

According to a second aspect of the present disclosure, a contactless power supply system is provided to include a transmission apparatus; and a reception apparatus to which the transmission apparatus supplies power in a contactless manner. The transmission apparatus includes: a primary resonant circuit including a primary coil and a primary capacitor; an AC power source that supplies AC power having a predetermined operating frequency to the primary resonant circuit; a variable impedance element connected between the primary coil and the AC power source to change a state of the transmission apparatus between a transmission state and a standby state; a primary side control circuit that changes an impedance of the variable impedance element; and a primary detection circuit that detects at least one of a magnitude of a magnetic flux interlinking with the primary coil and a magnitude of a magnetic flux in the vicinity of the primary coil. The reception apparatus includes: a secondary resonant circuit including a secondary coil to be magnetically coupled with the primary coil, and a secondary capacitor; a rectifier circuit that rectifies an AC power outputted from the secondary resonant circuit, including a rectifier switch in at least either a lower arm or an upper arm; an immittance circuit connected between the rectifier circuit and the secondary resonant circuit; a load to which a DC power outputted from the rectifier circuit is supplied; a protection switch of which the state is changed to be in a conductive state or a non-conductive state, thereby causing the secondary resonant circuit to be in a non-resonant state; a secondary side control circuit that sets the state of the protection switch to be in either the conductive state or the non-conductive state; and a state detection circuit that detects a state of the transmission apparatus. The secondary side control circuit performs a first process that sets, in response to a reception of a power supply stop signal, the rectifier switch to be in the conductive state before setting the protection switch to be in the conductive state, and in the case where the state of the transmission apparatus detected by the state detection unit after performing the first process is in the transmission state, the secondary side control circuit sets the protection switch to be in the conductive state; the primary side control circuit is configured to change the impedance of the variable impedance element, using at least one of a detection value of the primary detection circuit which changes depending on the state of the rectifier switch being set to be in the conductive state and a detection value of the primary detection circuit which changes depending on the state of the protection switch being set to be in the conductive state or the non-conductive state, thereby causing the reception apparatus to be in the standby state from the transmission state.

According to the second aspect, since the reception apparatus includes a protection switch and a rectifier circuit including a rectifier switch, when the reception apparatus is in an abnormal state, the protection switch or the rectifier switch of the rectification circuit is used to decrease an amount of current supplied to the load, whereby the load can be protected. Further, the primary side control circuit increases the impedance of the primary resonant circuit to be higher in the case where the magnetic flux in the vicinity of the primary coil becomes smaller in the transmission state, thereby causing the state to be in the standby state. Thus, power consumption which does not contribute the power supply in the transmission apparatus can be reduced.

According to a third aspect of the present disclosure, a transmission apparatus that supplies power to a reception apparatus in a contactless manner is provided. The transmission apparatus includes: a primary resonant circuit including a primary coil and a primary capacitor; an AC power source that supplies AC power having a predetermined operating frequency to the primary resonant circuit; a variable impedance element connected between the primary coil and the AC power source to change a state of the transmission apparatus between a transmission state and a standby state; a primary side control circuit that changes an impedance of the variable impedance element; and a primary detection circuit that detects at least one of a magnitude of a magnetic flux interlinking with the primary coil and a magnitude of a magnetic flux in the vicinity of the primary coil. The reception apparatus includes: a secondary resonant circuit including a secondary coil to be magnetically coupled with the primary coil, and a secondary capacitor; a rectifier circuit that rectifies an AC power outputted from the secondary resonant circuit; an immittance circuit connected between the rectifier circuit and the secondary resonant circuit; a load to which a DC power outputted from the rectifier circuit is supplied; a protection switch of which the state is changed to be in a conductive state or a non-conductive state, thereby causing the secondary resonant circuit to be in a non-resonant state; a secondary side control circuit that sets the state of the protection switch to be in either the conductive state or the non-conductive state. The primary side control circuit is configured to change the impedance of the variable impedance element, using a detection value of the primary detection circuit which changes depending on the state of the protection switch being set to be in the conductive state or the non-conductive state, thereby causing the reception apparatus to be in the standby state from the transmission state.

According to the third aspect, since the reception apparatus includes a protection switch, when the reception apparatus is in an abnormal state, the protection switch is used to decrease an amount of current supplied to the load, whereby the load can be protected. Further, the primary side control circuit increases the impedance of the primary resonant circuit to be higher in the case where the magnetic flux in the vicinity of the primary coil becomes smaller in the transmission state, thereby causing the state to be in the standby state. Thus, power consumption which does not contribute the power supply in the transmission apparatus can be reduced.

According to a fourth aspect of the present disclosure, a reception apparatus supplied with power from a transmission apparatus in a contactless manner is provided. The transmission apparatus includes: a primary resonant circuit including a primary coil and a primary capacitor; an AC power source that supplies AC power having a predetermined operating frequency to the primary resonant circuit; a variable impedance element connected between the primary coil and the AC power source to change a state of the transmission apparatus between a transmission state and a standby state; a primary side control circuit that changes an impedance of the variable impedance element; and a primary detection circuit that detects at least one of a magnitude of a magnetic flux interlinking with the primary coil and a magnitude of a magnetic flux in the vicinity of the primary coil. The reception apparatus includes: a secondary resonant circuit including a secondary coil to be magnetically coupled with the primary coil, and a secondary capacitor; a rectifier circuit that rectifies an AC power outputted from the secondary resonant circuit; an immittance circuit connected between the rectifier circuit and the secondary resonant circuit; a load to which a DC power outputted from the rectifier circuit is supplied; a protection switch of which the state is changed to be in a conductive state or a non-conductive state, thereby causing the secondary resonant circuit to be in a non-resonant state; a secondary side control circuit that sets the state of the protection switch to be in either the conductive state or the non-conductive state. The primary side control circuit is configured to change the impedance of the variable impedance element, using a detection value of the primary detection circuit which changes depending on the state of the protection switch being set to be in the conductive state or the non-conductive state, thereby causing the reception apparatus to be in the standby state from the transmission state.

According to the fourth aspect, since the reception apparatus includes a protection switch, when the reception apparatus is in an abnormal state, the protection switch is used to decrease an amount of current supplied to the load, whereby the load can be protected. Further, the primary side control circuit increases the impedance of the primary resonant circuit to be higher in the case where the magnetic flux in the vicinity of the primary coil becomes smaller in the transmission state, thereby causing the state to be in the standby state. Thus, power consumption which does not contribute the power supply in the transmission apparatus can be reduced.

What is claimed is:

1. A contactless power supply system comprising:

a transmission apparatus; and a reception apparatus to which the transmission apparatus supplies power in a contactless manner, wherein the transmission apparatus comprises:

a primary resonant circuit including a primary coil and a primary capacitor;

an AC power source that supplies AC power having a predetermined operating frequency to the primary resonant circuit;

a variable impedance element connected between the primary coil and the AC power source to change a state of the transmission apparatus between a transmission state and a standby state;

a primary side control circuit that changes an impedance of the variable impedance element; and a primary detection circuit that detects at least one of a magnitude of a magnetic flux interlinking with the primary coil and a magnitude of a magnetic flux in the vicinity of the primary coil, the reception apparatus comprises:

a secondary resonant circuit including a secondary coil to be magnetically coupled with the primary coil, and a secondary capacitor;

a rectifier circuit that rectifies an AC power outputted from the secondary resonant circuit;

an immittance circuit connected between the rectifier circuit and the secondary resonant circuit;

a load to which a DC power outputted from the rectifier circuit is supplied; and a protection switch of which the state is changed to be in a conductive state or a non-conductive state, thereby causing the secondary resonant circuit to be in a non-resonant state; and a secondary side control circuit that sets the state of the protection switch to be in either the conductive state or the non-conductive state, and the primary side control circuit is configured to change the impedance of the variable impedance element, using a detection value of the primary detection circuit which changes depending on the state of the protection switch being set to be in the conductive state or the non-conductive state, thereby causing the reception apparatus to be in the standby state from the transmission state.

2. The contactless power supply system according to claim 1, wherein the secondary capacitor is connected in series to the secondary coil;

the protection switch is connected in parallel to the secondary coil; and the secondary side control circuit is configured to set the protection switch to be in the conductive state in response to a reception of a power supply stop signal.

3. The contactless power supply system according to claim 2, wherein the protection switch is configured as at least one of a bi-directional switch using two MOSFETs, a semiconductor relay, and a triac.

4. The contactless power supply system according to claim 2, wherein the rectifier circuit includes a rectifier switch in at least either a lower arm or an upper arm;

the secondary side control circuit is configured to set, in response to a reception of a power supply stop signal, the rectifier switch to be in the conductive state before setting the protection switch to be in the conductive state.

5. The contactless power supply system according to claim 1, wherein the secondary capacitor is connected in series to the secondary coil;

the protection switch is connected in parallel to the secondary capacitor; and the secondary side control circuit sets the protection switch to be in the conductive state in response to a reception of the power supply stop signal.

6. The contactless power supply system according to claim 1, wherein the protection switch is configured as at least one of a bi-directional switch using two MOSFETs, a semiconductor relay, and a triac.

7. The contactless power supply system according to claim 5, wherein the rectifier circuit includes a rectifier switch in at least either a lower arm or an upper arm;

the secondary side control circuit is configured to set, in response to a reception of a power supply stop signal, the protection switch to be in the conductive state after setting the rectifier switch to be in the non-conductive state.

8. The contactless power supply system according to claim 1, wherein the secondary capacitor is connected in series to the secondary coil;

the protection switch is a semiconductor switching element and connected in series between the secondary capacitor and the rectifier circuit; and the secondary side control circuit changes, in response to a reception of a stop power supply signal, a state of the protection switch to be in the non-conductive state.

9. The contactless power supply system according to claim 8, wherein the protection switch is a bi-directional switch using two MOSFETs.

10. The contactless power supply system according to claim 8, wherein the protection switch is configured of a single MOSFET.

11. A contactless power supply system comprising:

a transmission apparatus; and a reception apparatus to which the transmission apparatus supplies power in a contactless manner, wherein the transmission apparatus comprises:

a primary resonant circuit including a primary coil and a primary capacitor;

an AC power source that supplies AC power having a predetermined operating frequency to the primary resonant circuit;

a variable impedance element connected between the primary coil and the AC power source to change a state of the transmission apparatus between a transmission state and a standby state;

a primary side control circuit that changes an impedance of the variable impedance element; and a primary detection circuit that detects at least one of a magnitude of a magnetic flux interlinking with the primary coil and a magnitude of a magnetic flux in the vicinity of the primary coil, the reception apparatus comprises:

a secondary resonant circuit including a secondary coil to be magnetically coupled with the primary coil, and a secondary capacitor;

a rectifier circuit that rectifies an AC power outputted from the secondary resonant circuit, including a rectifier switch in at least either a lower arm or an upper arm;

an immittance circuit connected between the rectifier circuit and the secondary resonant circuit;

a load to which a DC power outputted from the rectifier circuit is supplied;

a protection switch of which the state is changed to be in a conductive state or a non-conductive state, thereby causing the secondary resonant circuit to be in a non-resonant state;

a secondary side control circuit that sets the state of the protection switch to be in either the conductive state or the non-conductive state; and a state detection circuit that detects a state of the transmission apparatus, wherein the secondary side control circuit performs a first process that sets, in response to a reception of a power supply stop signal, the rectifier switch to be in the conductive state before setting the protection switch to be in the conductive state, and in the case where the state of the transmission apparatus detected by the state detection unit after performing the first process is in the transmission state, the secondary side control circuit sets the protection switch to be in the conductive state;

the primary side control circuit is configured to change the impedance of the variable impedance element, using at least one of a detection value of the primary detection circuit which changes depending on the state of the rectifier switch being set to be in the conductive state and a detection value of the primary detection circuit which changes depending on the state of the protection switch being set to be in the conductive state or the non-conductive state, thereby causing the reception apparatus to be in the standby state from the transmission state.

12. The contactless power supply system according to claim 11, wherein the state detection circuit detects a temperature of at least one of the rectifier switch and the immittance circuit, and outputs a signal indicating that the transmission apparatus is in the transmission state in the case where the detected temperature is higher than a predetermined reference temperature.

13. A transmission apparatus that supplies power to a reception apparatus in a contactless manner, wherein the transmission apparatus comprises:

a primary resonant circuit including a primary coil and a primary capacitor;

an AC power source that supplies AC power having a predetermined operating frequency to the primary resonant circuit;

a variable impedance element connected between the primary coil and the AC power source to change a state of the transmission apparatus between a transmission state and a standby state;

a primary side control circuit that changes an impedance of the variable impedance element; and a primary detection circuit that detects at least one of a magnitude of a magnetic flux interlinking with the primary coil and a magnitude of a magnetic flux in the vicinity of the primary coil, the reception apparatus comprises:

a secondary resonant circuit including a secondary coil to be magnetically coupled with the primary coil, and a secondary capacitor;

a rectifier circuit that rectifies an AC power outputted from the secondary resonant circuit;

an immittance circuit connected between the rectifier circuit and the secondary resonant circuit;

a load to which a DC power outputted from the rectifier circuit is supplied;

a protection switch of which the state is changed to be in a conductive state or a non-conductive state, thereby causing the secondary resonant circuit to be in a non-resonant state;

a secondary side control circuit that sets the state of the protection switch to be in either the conductive state or the non-conductive state, wherein the primary side control circuit is configured to change the impedance of the variable impedance element, using a detection value of the primary detection circuit which changes depending on the state of the protection switch being set to be in the conductive state or the non-conductive state, thereby causing the reception apparatus to be in the standby state from the transmission state.

14. A reception apparatus supplied with power from a transmission apparatus in a contactless manner, wherein the transmission apparatus comprises:

a primary resonant circuit including a primary coil and a primary capacitor;

an AC power source that supplies AC power having a predetermined operating frequency to the primary resonant circuit;

a variable impedance element connected between the primary coil and the AC power source to change a state of the transmission apparatus between a transmission state and a standby state;

a primary side control circuit that changes an impedance of the variable impedance element; and a primary detection circuit that detects at least one of a magnitude of a magnetic flux interlinking with the primary coil and a magnitude of a magnetic flux in the vicinity of the primary coil, the reception apparatus comprises:

a secondary resonant circuit including a secondary coil to be magnetically coupled with the primary coil, and a secondary capacitor;

a rectifier circuit that rectifies an AC power outputted from the secondary resonant circuit;

an immittance circuit connected between the rectifier circuit and the secondary resonant circuit;

a load to which a DC power outputted from the rectifier circuit is supplied;

a protection switch of which the state is changed to be in a conductive state or a non-conductive state, thereby causing the secondary resonant circuit to be in a non-resonant state;

a secondary side control circuit that sets the state of the protection switch to be in either the conductive state or the non-conductive state, wherein the primary side control circuit is configured to change the impedance of the variable impedance element, using a detection value of the primary detection circuit which changes depending on the state of the protection switch being set to be in the conductive state or the non-conductive state, thereby causing the reception apparatus to be in the standby state from the transmission state.

* * * * *